US008521654B2

(12) United States Patent
Ford et al.

(10) Patent No.: US 8,521,654 B2
(45) Date of Patent: Aug. 27, 2013

(54) ONLINE METHOD AND SYSTEM FOR ADVISING CUSTOMERS ON SERVICE NEEDS, FACILITATING THE SCHEDULING OF VEHICLE SERVICE APPOINTMENTS, AND CHECKING VEHICLE SERVICE STATUS

(75) Inventors: David John Ford, Canton, MI (US); John Garfield Graham, Plymouth, MI (US); Joseph Retzbach, Novi, MI (US); Kenneth James McCaffrey, Canton, MI (US); Nadine Ann Mooney, Livonia, MI (US)

(73) Assignee: Ford Motor Company, Dearborn, MI (US)

( * ) Notice: Subject to any disclaimer, the term of this patent is extended or adjusted under 35 U.S.C. 154(b) by 3309 days.

(21) Appl. No.: 10/442,806

(22) Filed: May 21, 2003

(65) Prior Publication Data
US 2004/0059618 A1 Mar. 25, 2004

Related U.S. Application Data

(63) Continuation-in-part of application No. 10/064,962, filed on Sep. 4, 2002.

(51) Int. Cl.
*G06Q 10/00* (2012.01)
(52) U.S. Cl.
USPC ............................ 705/305; 705/303; 705/304
(58) Field of Classification Search
USPC .................................. 705/303, 304, 305, 346
See application file for complete search history.

(56) References Cited

U.S. PATENT DOCUMENTS

| 5,748,907 | A | 5/1998 | Crane |
| 5,778,346 | A | 7/1998 | Frid-Nielsen et al. |
| 5,848,395 | A | 12/1998 | Edgar et al. |
| 5,920,846 | A | 7/1999 | Storch et al. |
| 6,085,166 | A | 7/2000 | Beckhardt et al. |
| 6,101,480 | A | 8/2000 | Conmy et al. |
| 6,304,848 | B1 * | 10/2001 | Singer ............................. 705/3 |
| 6,345,260 | B1 | 2/2002 | Cummings, Jr. et al. |
| 6,389,454 | B1 | 5/2002 | Ralsont et al. |
| 6,523,335 | B2 * | 2/2003 | Vanderipe ..................... 56/16.7 |

(Continued)

FOREIGN PATENT DOCUMENTS
WO WO 99/38079 7/1999

OTHER PUBLICATIONS

Skonnard, Aaron, SOAP: The Simple Object Access Protocol, Microsoft Internet Developer, Jan. 2000.*

(Continued)

*Primary Examiner* — Gerardo Araque, Jr.
(74) *Attorney, Agent, or Firm* — Damian Porcari; Brooks Kushman P.C.

(57) ABSTRACT

One aspect of the present invention is an online method for advising a customer on service needs and facilitating the scheduling of a vehicle service appointment. The method can comprise receiving a service inquiry, receiving input information regarding potential service of the vehicle, transmitting an open appointments request to a dealer management system (DMS), receiving a plurality of open appointments from the DMS, causing display of the plurality of open appointments wherein one of the plurality of open appointments is selected as an appointment request, and transmitting the input information and the appointment request to the DMS to facilitate the scheduling of the vehicle service appointment. The last four steps outlined can be conducted in substantially real-time.

10 Claims, 24 Drawing Sheets

(56) References Cited

U.S. PATENT DOCUMENTS

| | | | |
|---|---|---|---|
| 7,069,228 B1* | 6/2006 | Rose et al. | 705/5 |
| 7,249,041 B2* | 7/2007 | Last | 705/5 |
| 2001/0011225 A1* | 8/2001 | O'Connor et al. | 705/9 |
| 2001/0027481 A1* | 10/2001 | Whyel | 709/218 |
| 2001/0037225 A1* | 11/2001 | Last | 705/5 |
| 2001/0054064 A1* | 12/2001 | Kannan | 709/203 |
| 2002/0022975 A1* | 2/2002 | Blasingame et al. | 705/3 |
| 2002/0022980 A1 | 2/2002 | Mozayeny et al. | |
| 2002/0032588 A1* | 3/2002 | Glazer et al. | 705/6 |
| 2002/0035493 A1 | 3/2002 | Mozayeny et al. | |
| 2002/0069216 A1 | 6/2002 | Bates | |
| 2002/0072808 A1 | 6/2002 | Li | |
| 2002/0073012 A1 | 6/2002 | Lowell et al. | |
| 2002/0103583 A1 | 8/2002 | Ohmura et al. | |
| 2002/0107716 A1 | 8/2002 | Callahan et al. | |
| 2002/0111844 A1 | 8/2002 | Vanstory et al. | |
| 2002/0116232 A1* | 8/2002 | Rapp et al. | 705/5 |
| 2002/0120485 A1 | 8/2002 | Kirkconnell-Ewing et al. | |
| 2002/0131572 A1 | 9/2002 | Paradis | |
| 2002/0143600 A1 | 10/2002 | Dugan | |
| 2002/0156672 A1 | 10/2002 | Burko | |
| 2002/0191035 A1* | 12/2002 | Selent | 345/866 |
| 2003/0004776 A1 | 1/2003 | Perrella et al. | |
| 2003/0009360 A1 | 1/2003 | Chaudhary et al. | |
| 2003/0191660 A1* | 10/2003 | Himes | 705/1 |
| 2004/0039626 A1* | 2/2004 | Voorhees | 705/9 |

OTHER PUBLICATIONS

Bill Wink Chevrolet, Feb. 22, 2002, http://web.archive.org/web/20020222201739/http://www.billwinkchevy.com/appointment.htm.*

Bill Wink's Chevrolet, http://web.archive.org/web/20010408092103/billwinkchevy.com/index.htm, 32 Pages.*

Web Site, http://nitra.acuradealer.com/tischer/en_US/ServiceApptForm.jsp Service Appointment Request, printed on Mar. 3, 2003, 2 pages.

Web Site, http://www.passportnissanva.com/cgi-bin/formLibrary/form.asp, Schedule Service, printed on Mar. 3, 2003, 2 pages.

Web Site, http://myautogarage.com/index.jsp. Registration, printed on Jan. 20, 2003, 5 pages.

Web Site, http://www.joeauto.com/, printed on Jan. 20, 2003, 6 pages.

Web Site, http://autos.yahoo.com/maintain.html. printed on Jan. 20, 2003, 3 pages.

Web Site, http://www._cobaltgroup.com/products/nitra.jsp, printed on Jan. 20, 2003, 2 pages.

Web Site, http://xtime.com/solutions/auto.html, Xtime Solutions, printed on Jan. 20, 2003, 2 pages.

Web Site, http://www.disobey.com/ghostsites/show_exhibit.shtml/jacknabbit, jacknabbit.com, printed on Jan. 20, 2003, 1 page.

Web Site, http://www.timehighway.com/, printed on Jan. 20, 2003, 2 pages.

Web Site, http://www.universalcomputersys.com/products/service.asp, printed on Jan. 20, 2003, 5 pages.

Web Site, http//www.automark.net/, printed on Jan. 20, 2003, 1 page.

Web Site, http://www.alldata.com/recalls/index.html, Alldata, Recalls and Technical Service Bulletin Titles, 1 page.

Web Site, http://www.ftcollins4x4.com/, Fort Collins 4x4 Center, printed on Mar. 15, 2002, 2 pages.

Web Site, http://home.dealerconnection.com/DealerConnection/web/service/parent.asp, Jerome-Duncan, Inc., printed on Mar. 13, 2002.

Web Site, http://www.billwinkchevy.com/appointment.htm, printed on Mar. 13, 2003, 1 page.

Web Site, http://www.icarumba.com/icarumba/default.asp, printed on Mar. 13, 2002, 4 pages.

Web Site, http://www.happycars.com/mainframe.html, Superior Auto Service, Inc., printed on Mar. 13, 2002, 3 pages.

Web Site, http://www.dannemanauto.com/, Danneman's Auto Service, Inc., printed on Mar. 13, 2002, 3 pages.

Web Site, http://www.motorquest-mi.fivestardealers.com/information-appt_sched.cgi, Joe Ricci Dodge of Dearborn, LLC.—Dearborn, Michigan, printed on Mar. 13, 2002, 2 pages.

* cited by examiner

Vehicle Make: ○ Ford  ○ Lincoln  ○ Mercury

Model Year:

Vehicle Model:

Maintenance Schedule Type:

(Information used for recommending maintenance)
For details, please click Maintenance Schedule Type Help

{ 82

The information supplied for model years prior to 1995 is a general guideline to assist with looking up your vehicle's regular scheduled maintenance.

Continue — 86

| View Selected Services | Service Appointment | Regular Maintenance | Check Recalls | Service Status | Privacy Statement |

| | Price | Selected |
|---|---|---|
| ☑ Current Service Interval 55000 miles includes:<br>☑ Perform multi-point inspection (2-11)<br>☑ Replace engine oil and filter<br>☑ Rotate tires | $250 | $250 |
| ☐ Additional Dealer Recommended Service:<br>☑ Replace spark plugs | Contact our Service Department | |
| ☐ Replace air filter | Contact our Service Department | |
| Total | | $250 |
| ☑ Next Service Interval 60000 miles includes:<br>☑ Inspect accessory drive belt(s)<br>☑ Replace engine oil and filter<br>☑ Replace fuel filter | $275 | $275 |
| ☑ Additional Dealer Recommended Service:<br>☑ Replace spark plugs<br>☑ Replace air filter | $50 | $50 |
| Total | | $325 |
| ☐ Previous Major Service Interval 50000 miles included:<br>☐ Replace engine coolant<br>☐ Replace engine oil and filter<br>☐ Inspect brake system & rotate tires | $195 | |
| ☐ Additional Dealer Recommended Service:<br>☐ Replace spark plugs<br>☐ Replace air filter | $50 | $50 |
| Total | | $50 |

( Print Page )  ( Schedule Appointment )  ( Next Service Request )

View Selected Services | Service Appointment | Regular Maintenance | Check Recalls | Service Status | Privacy Statement

*Fig. 8b*

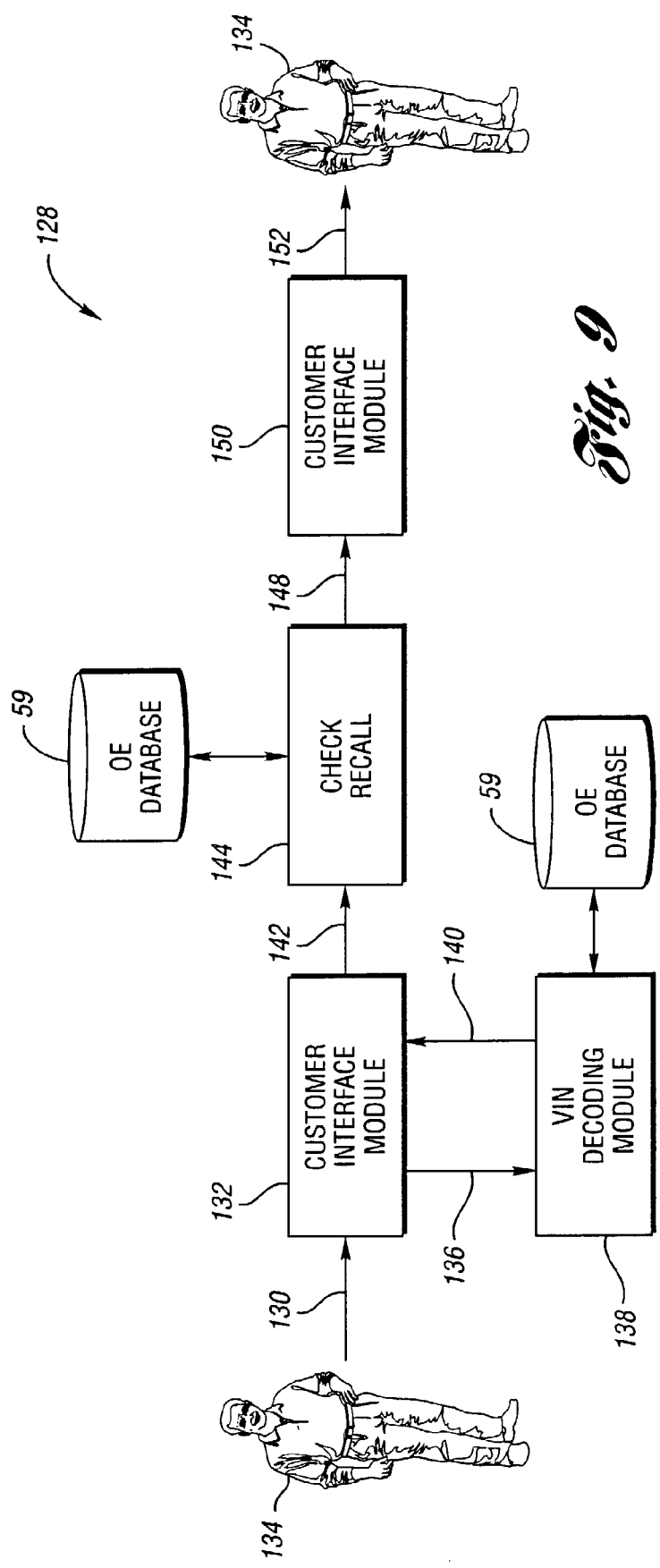

Vehicle Information:

2001 Ford Crown Victoria
VIN:
1GRZU53XXUYCC39176
Mileage: 12,500

< 1 2 3 >

Previous 3     Next 3

Recall(s) Performed at No Charge
Included automatically in service appointment.

(1) 01S19 PROTECTIVE SPRING SHIELDS

*** *Prices are subject to change.* ***
Regular Scheduled Maintenance:
Please check the item(s) you want included:

Price    Selected

☐ Current Service Interval 5000 miles includes:    $49.52
    ☐ Oil and Filter Change
    ☐ Rotate and Balance Tires
☐ Additional Dealer Recommended Service:
    ☐ Spark Plug Change
    ☑ Air Filter Change Contact our Service
Department Enter any additional information or special Instructions below:
Example: "Preferred Service Advisor." "Will wait for service."

Message from our Service Department ( Continue Appointment ) — 184

| View Selected Services | Service Appointment | Regular Maintenance | Check Recalls | Service Status | Privacy Statement |

*Fig. 12b*

☑ Remember my information for the next time

◁ Start Over

176

Vehicle Shop Routing
Tag Number: ▭

OR

Vehicle Identification
Number: ▭

For assistance on locating your Vehicle
Identification Number, please click VIN Help.

OR

Your Phone Number: (▭) ▭ Ext: ▭

☑ Remember my
information for the
next time ( Check Status ) — 198

| View Selected Services | Service Appointment | Regular Maintenance | Check Recalls | Service Status | Privacy Statement |

*Fig. 14b*

Future Appointments
Date: January 24, 2002 at 9:15am
Vehicle Make: Ford Explorer
Model:
Model Year: 2000

If you would like to be notified via e-mail when your vehicle's service work is completed.

E-mail Address: — 202

Messages from our Service Department

Continue — 204

| View Selected Services | Service Appointment | Regular Maintenance | Check Recalls | Service Status | Privacy Statement |

*Fig. 15b*

ONLINE METHOD AND SYSTEM FOR ADVISING CUSTOMERS ON SERVICE NEEDS, FACILITATING THE SCHEDULING OF VEHICLE SERVICE APPOINTMENTS, AND CHECKING VEHICLE SERVICE STATUS

CROSS-REFERENCE TO RELATED APPLICATIONS

This application is a continuation-in-part of U.S. patent application Ser. No. 10/064,962, entitled "An Online Method And System For Advising Customers On Service Needs, Facilitating The Scheduling Of Vehicle Service Appointments, And Checking Vehicle Service Status" and filed on Sep. 4, 2002, which is hereby incorporated by reference.

BACKGROUND OF THE INVENTION

1. Field of the Invention

One aspect of this invention relates generally to an online method and system for advising customers on service needs, facilitating the scheduling of vehicle service appointments, and checking vehicle service status.

2. Background Art

Conventionally, scheduling a service appointment at an automobile dealership involves interacting with a dealership representative. A customer communicates a service request and availability to the dealership representative. Often, the customer communicates with the dealership representative via telephone calls, e-mail, or traditional mail.

The representative interprets the information provided by the customer and usually translates the information onto paper or enters the information into a dealer management system. Sometimes, the information is not translated or entered correctly, leading to errors in the scheduling of the service appointment or in the servicing of the customer's vehicle. As a result, the customer's confidence that their service needs will be accurately interpreted and processed in a timely manner at the dealership is relatively low.

In addition, the questions used by different representatives to identify symptoms of the vehicle problem vary greatly. Therefore, there is a lack of uniformity in the information obtained by the interaction between the customer and the representative. As a result, service needs are often improperly diagnosed, if diagnosed at all.

Moreover, conventional methods for scheduling service requests usually require that the service appointment request is made during regular operating hours of the dealership.

A system for offering online appointment scheduling, available from ADP, Inc. (ADP) is referred to as myautogarage.com iServ, otherwise referred to as myautogarage. Although the myautogarage system accommodates scheduling service appointments past regular operating hours, the system is disadvantageous because it can result in double booking appointments. Myautogarage requires set up of two separate calendars that invariably share the same open appointments. FIG. 1 represents a schematic diagram illustrating the myautogarage system.

FIG. 1 illustrates dealer management computer 12, scheduling computer 14, dealer website server 16, interconnected by a computer network. Scheduling computer 14 is administered by ADP. Dealer management computer 12 serves dealer computer 18 for use by a dealer representative in scheduling appointments requested by a customer that visits a dealer or phones the dealer representative. Dealer management computer 12 also stores appointment calendar information to and retrieves appointment calendar data from dealer management database 20. Dealer management database 20 includes first appointment calendar 22. Scheduling computer 14 stores appointment calendar information to and retrieves appointment calendar data from scheduling database 30. Scheduling database 30 includes second appointment calendar 24. Dealer website 16 serves customer computer 28 for scheduling appointments online.

A dealer interested in online appointment scheduling through myautogarage contacts ADP, which sends an appointment calendar form to the interested dealer, usually via fax machine. The dealer fills in the form with a group of open appointments. For example, the dealer can select twenty fifteen minute appointments per day for the next thirty available appointment days. Typically, the completed form is sent to ADP via fax machine and ADP updates second appointment calendar 30, accordingly.

At this point, myautogarage is ready to schedule appointments online for the dealer. To this end, scheduling computer 14 transmits open appointments in second appointment calendar 24 to customer computer 28 through dealer website server 16 upon receiving a schedule appointment request initiated by the customer. The appointment times are displayed on customer computer 28 through a user interface. The customer then selects one of the available appointments. Second appointment calender 24 stored in scheduling database 30 is updated to reflect the customer's selection. As a drawback to the myautogarage system, first appointment calendar 22 is not automatically updated to reflect the customer's appointment selection.

Instead, scheduling computer 14 periodically pushes scheduled appointment information to dealer management computer 12. A dealer representative then must manually accept or decline the scheduled appointment information and update first appointment calendar 22 stored in dealer management database 20 through data entry to reflect the pushed scheduled appointment information. In many cases, substantial time elapses between an online customer selecting an open appointment and manual confirmation and update of first appointment calendar 22. Disadvantageously, the customer can receive notification, via e-mail or telephone, from the dealer representative that the scheduled appointment is no longer available, after the substantial time lapse, which could be several days in certain circumstances.

During the elapsed time, customers can schedule the same appointment offline by calling or visiting the dealer. According to this process, dealer management computer 12 transmits open appointments in first appointment calendar 22 to dealer computer 18. The open appointments are displayed on dealer computer 18 through a user interface so that a dealer representative can review and communicate the times to the customer scheduling the appointment. The customer decides upon an available appointment based on information provided by the dealership representative. The dealer representative inputs the available appointment into the user interface to reflect that the appointment time is no longer available and dealer management database 12 is updated accordingly.

Since dealers do not want to pass up opportunities to schedule appointments offline or online, first and second appointment calendars 20 and 24 often share the same open appointments. Appointment sharing in combination with the elapsed time between online appointment selection and update of first appointment calender 22 cause inevitable double booking of appointments. This common problem with the myautogarage system can lead to low customer confidence in dealers utilizing the myautogarage system. The two appointment calendar setup does not allocate appointment times in an efficient manner due to the lack of real-time integration between the myautogarage system and first appointment calendar 22 stored in dealer management database 20.

What is needed is an online interactive method and system for advising customers on service needs and facilitating the scheduling of service appointments which increases the uniformity of the scheduling process. In addition, an online interactive method and system is needed that allows customers to schedule appointments and advises customers of service needs beyond normal operating hours of the dealership. Moreover, an online interactive method and system is needed to allow customers to check vehicle service status. What is also needed is an online method and system for providing recall and/or maintenance information from a original equipment (OE) database source. This information should include pricing and scheduling information for vehicle maintenance. Additionally, there is a need to provide an online interactive method and system for scheduling service appointments directly with the dealership without interrupting the dealership's normal shop loading process.

SUMMARY OF THE INVENTION

According to one embodiment of the present invention, an online method for advising a customer on service needs and facilitating the scheduling of a vehicle service appointment is disclosed. The method can be comprised of (a) receiving a service inquiry, (b) receiving input information regarding the potential service of the vehicle, (c) transmitting an open appointments request to a dealer management system (DMS), the DMS communicates with a vehicle service provider, (d) receiving a plurality of open appointments from the DMS, (e) causing display of the plurality of open appointments wherein one of the plurality of open appointments is selected as an appointment request, and (f) transmitting the input information and appointment request to the DMS to facilitate the scheduling of the vehicle service appointment. The service inquiry can be selected from the group consisting of a service request, a scheduled maintenance request, and a recall request. The service inquiry can be selected by the customer. If the service inquiry is a service request, the input information includes information defining vehicle symptoms pertinent to the service request. If the service inquiry is the scheduled maintenance request or the recall request, the input information includes a vehicle identification number or the vehicle make, vehicle model year and vehicle model. The input information can be used to determine whether service is advised for the vehicle. Advantageously, steps (c), (d), (e) and (f) can be conducted in substantially real-time so that a service customer can request an appointment and receive confirmation from the vehicle service provider in substantially real-time.

In certain embodiments of the present invention, the online method can further include retrieving recall information or maintenance information from an original equipment database based on the input information and causing display of the recall information or maintenance information. Moreover, the online method can include causing display of the input information in a pre-appointment format within the DMS for shop loading or validation purposes. It should be understood that steps (a) and (b) can be conducted one or more times.

The input information defining vehicle symptoms pertinent to the service request can include a vehicle symptom string. The online method can further include determining an at least two symptom probing questions based on the vehicle symptom string. These symptom probing questions can be transmitted to the customer. The answers to the at least two symptom probing questions can be transmitted to the vehicle service provider.

According to a second embodiment of the present invention, an online vehicle service method is disclosed. The online method can be comprised of (a) receiving a service inquiry, (b) receiving input information regarding the potential service of the vehicle, (c) transmitting an open appointments request to a dealer management system (DMS), the DMS communicates with a vehicle service provider, (d) receiving a plurality of open appointments for the DMS, (e) causing display of the plurality of open appointments wherein one of the plurality of open appointments is selected as an appointment request, and (f) transmitting the input information and the appointment request to the DMS to facilitate the scheduling of the vehicle service appointment. The service inquiry is selected from the group consisting of a service request, a scheduled maintenance request, a recall request, and a vehicle status request. If the service inquiry is the service request, the input information includes information defining vehicle symptoms pertinent to the service request. If the service inquiry is the scheduled maintenance request or the recall request, the input information includes a vehicle identification number or the vehicle make, vehicle model and vehicle year. If the service inquiry is the vehicle status request, the input information includes an at least last name of a customer checking on the vehicle status. The input information can be used to determine whether service is advised for the vehicle or the vehicle status in the case of a vehicle status request.

The online method can further include retrieving recall information or maintenance information from an original equipment database based on the input information and causing display of the recall information or maintenance information. Additionally, the online method can include causing display of the input information in a pre-appointment format within the DMS for shop loading or validation purposes. Moreover, steps (c), (d), (e) and (f) can be conducted in substantially real-time. If the service inquiry is the vehicle status request, the online method can further include receiving vehicle status information from the vehicle service provider and causing display of the vehicle status information.

According to a third embodiment of the present invention, an online system for advising a customer on service needs and facilitating the scheduling of a vehicle service appointment is disclosed. The system is comprised of an at least one server computer operably serving at least one client computer. The at least one server computer can be configured to (a) receive a service inquiry, (b) receive input information regarding potential service of the vehicle, (c) transmit an open appointments request to a dealer management system (DMS), the DMS communicates with a vehicle service provider, (d) receive a plurality of open appointments from the DMS, (e) cause display of the plurality of open appointments wherein one of the plurality of open appointments is selected as an appointment request, and (f) transmit the input information and the appointment request to the DMS to facilitate the scheduling of the vehicle service appointment. The at least one server computer can be further configured to execute steps (c), (d), (e) and (f) in substantially real-time.

The at least one server computer can be additionally configured to retrieve recall information or maintenance information from an original equipment database based on the input information and cause display of the recall information or maintenance information. Additionally, the at least one server computer can be configured to cause display of the input information in a pre-appointment format within the DMS for shop loading or validation purposes.

The at least one server computer can be additionally configured to transmit the open appointments request as a request XML package to the vehicle service provider and to receive the plurality of open appointments as a response XML package from the vehicle service provider. Moreover, the at least one server computer can be additionally configured to transmit the appointment request in a request XML package to the vehicle service provider and to receive a response XML package confirming the appointment request from the vehicle service provider. If the service inquiry is the service request, the input information defining vehicle symptoms pertinent to the service request can include a vehicle symptom string.

In a fourth embodiment of the present invention, an online method for facilitating scheduling of a vehicle service appointment is disclosed. The online method can be comprised of (a) receiving a service inquiry, (b) receiving input information regarding potential service of the vehicle, (c) transmitting an open appointments request to a dealer management system (DMS), the DMS communicates with a vehicle service provider, (d) receiving a plurality of open appointments from the DMS, (e) causing display of potential service information based on the input information and the plurality of open appointments wherein one of the plurality of open appointments is selected as an appointment request, and (f) transmitting an appointment request to a DMS to facilitate scheduling of the vehicle service appointment. The online method can include performing steps (c), (d), (e) and (f) in substantially real-time.

The online method can also further include retrieving recall information or maintenance information from an original equipment database based on the input information and causing display of the recall information or maintenance information. The online method can further include causing display of the input information in a pre-appointment format within the DMS for shop loading or validation purposes.

In a fifth embodiment of the present invention, an apparatus for use in facilitating scheduling of the vehicle service appointment based on a service inquiry is disclosed. The apparatus can be comprised of a dealer computer having an interface for communicating over a computer network, a data structure stored in a memory and an application program utilizing an interface for communicating over the computer network and being executed on the dealer computer for transmitting in substantially real-time. The at least one dealer computer can include the memory for storing data.

The data structure can include open appointments data for facilitating scheduling of a vehicle service appointment based on the service inquiry. The application program can be executed for transmitting in substantially real-time at least a portion of the open appointments data in response to an open appointments request and receiving in real-time an appointment request and input information regarding the service inquiry. One of the plurality of open appointments can be selected as an appointment request. The dealer computer can be comprised of a dealer management system. The interface can be comprised of an extended mark-up language (XML). The application program can be comprised of a SOAP protocol. The apparatus can further comprise a user computer causing display of the plurality of open appointments and transmitting the input information and the appointment request to the dealer computer. The service inquiry can be selected from the group consisting of a service request, a scheduled maintenance request, and a recall request. If the service inquiry is a service request, the input information can include information defining vehicle symptoms pertinent to the service request. If the service inquiry is the scheduled maintenance request or the recall request, the input information can include a vehicle identification number or the vehicle make, vehicle model year, and vehicle model. The application program can be configured to transmit a confirmation or a rejection to the user computer.

In a sixth embodiment of the present invention, a computer program embodied on a computer-readable medium for facilitating the scheduling of a vehicle service appointment based on a service inquiry between a dealer computer and a user computer is disclosed. The computer program can be comprised of a request open appointment schema for requesting open appointments in a time window and including a start date, a transmit open appointments schema for transmitting a plurality of open appointments in the time window, a request service appointment schema for requesting an appointment request wherein one of the plurality of open appointments is selected as the appointment request and confirming service appointment schema for either confirming or rejecting the appointment request. The schemas can be comprised of XML packages. The time window can be comprised of 30 days. The request open appointment schema can be executed by a user computer and the confirming service appointment schema can be executed by a dealer computer. Additionally, the request service appointment schema can be executed by the user computer and the transmit open appointment schema can be executed by the dealer computer.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIGS. 6a and 6b illustrate a preferred GUI for entering information pertinent to a vehicle maintenance request in accord with a preferred embodiment of the present invention;

FIGS. 8a and 8b illustrate a preferred GUI for displaying information pertinent to a vehicle maintenance request in accord with a preferred embodiment of the present invention;

FIG. 9 is a block flow diagram illustrating a preferred methodology for implementing the VIN decoding and check recall modules in order to retrieve recall information from an OE database based on the VIN;

FIGS. 10a and 10b illustrate a preferred GUI for entering owner and vehicle information in accord with a preferred embodiment of the present invention;

FIGS. 12a and 12b illustrate a preferred GUI for displaying information relevant to the customer request(s) for the customer's review in accord with a preferred embodiment of the present invention;

FIGS. 14a and 14b illustrate a preferred GUI for entering information necessary to check the service status; and FIGS. 15a and 15b illustrate a preferred GUI for displaying information regarding the service status.

DETAILED DESCRIPTION OF THE PREFERRED EMBODIMENT(S)

Figure 1:
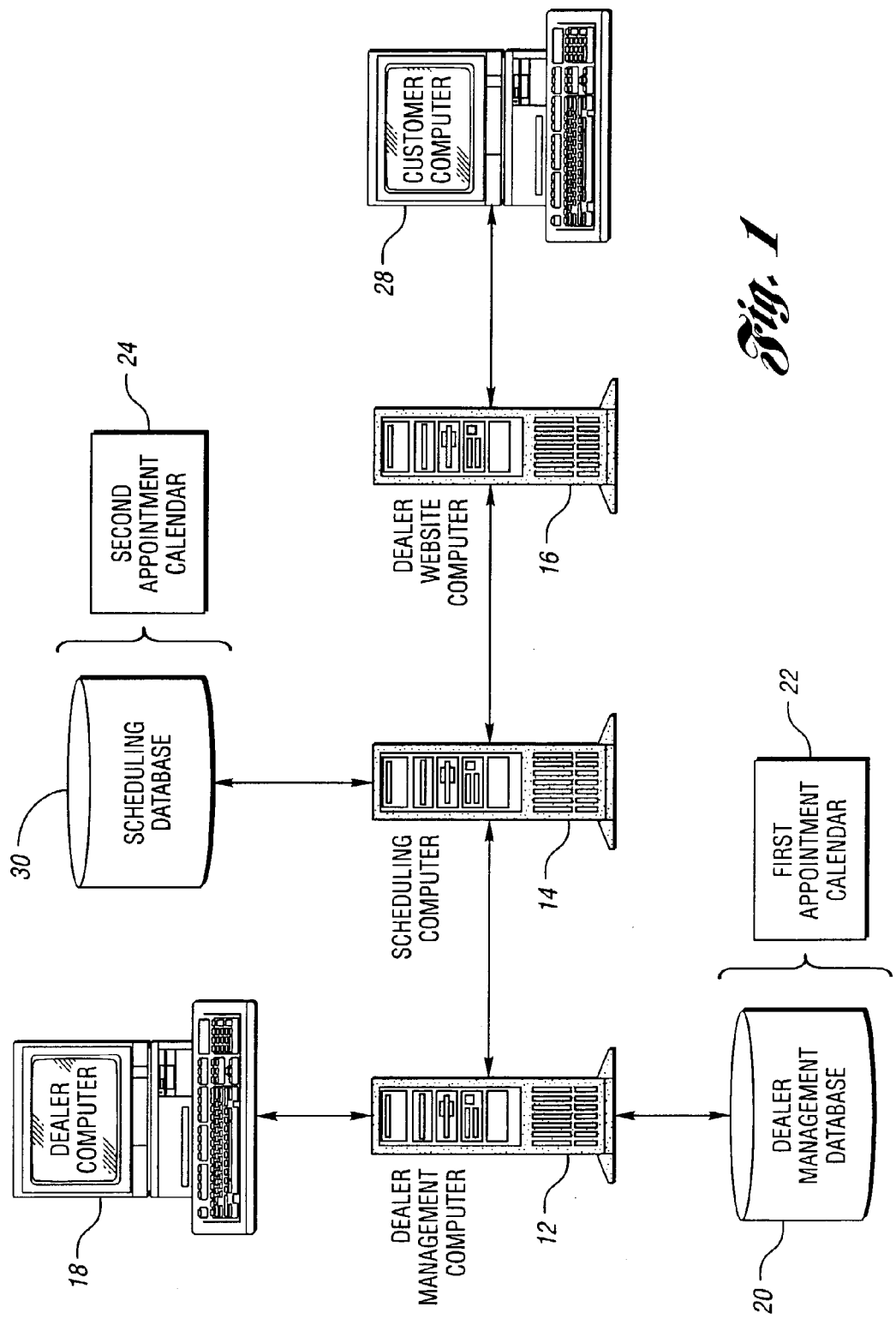
FIG. 1 represents a schematic diagram illustrating the myautogarage system.
Figure 2:
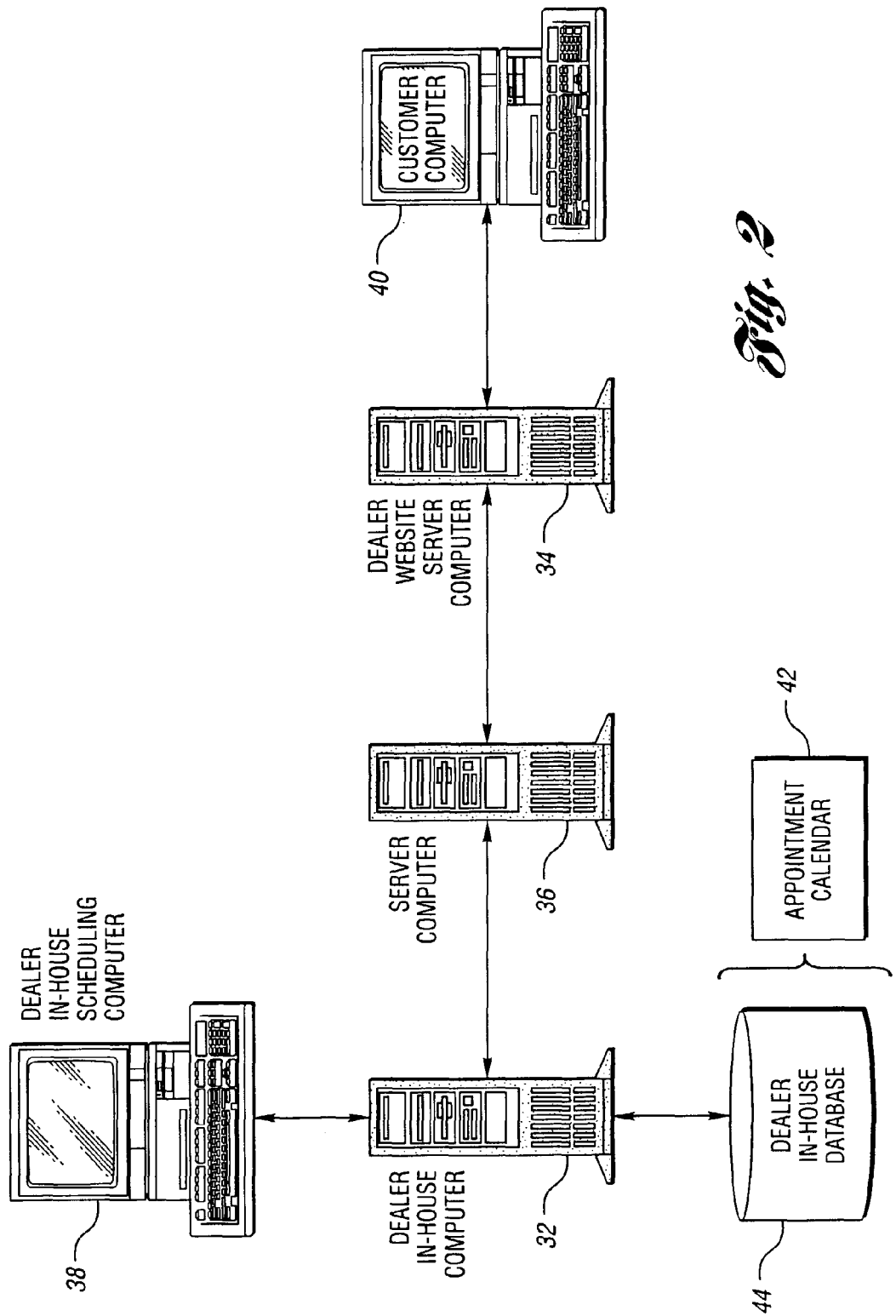
FIG. 2 represents a schematic diagram of a system embodiment of the present invention.

In contrast to the two calendar set up provided by myautogarage and as depicted in FIG. 1, FIG. 2 illustrates a schematic diagram of a system embodiment of the present invention for providing a single calendar system in which vehicle customers can interactively request appointments online during real-time directly from a dealer in-house computer or dealer management system (DMS). Advantageously, the system embodiment depicted in FIG. 2 does not utilize a second appointment calender dedicated to online appointments. Instead, the vehicle customer requests appointment times from a single appointment calender 42, which is accessible to a dealer in-house computer or DMS and is used for making online and offline appointments alike.

According to FIG. 2, dealer in-house computer 32, dealer website server computer 34 and server computer 36, are connected via a computer network.

Dealer in-house computer 32 can be in communication with a dealer management system (DMS) computer. In certain embodiments, the present invention contemplates providing appointment scheduling solutions that can be implemented with the dealers and non-dealers using a DMS. DMSs can be robust front-end systems that are utilized by dealers and non-dealers for scheduling and other purposes. In certain embodiments, the implementation of the present invention in combination with a DMS is advantageous due to its flexibility. This flexibility may not exist if the appointment scheduling functionality is incorporated into a stand-alone vehicle manufacturer computer system.

In accordance with the present invention, server computer 36 can communicate with dealer in-house computer 32 and dealer website server computer 34. Dealer in-house computer 32 is in communication with dealer in-house scheduling computer 38 through a computer network. Dealer in-house scheduling computer 38 can be utilized to assist dealer representatives in scheduling service appointments that are requested by customers via phone calls or dealer visits. Dealer in-house computer 32 can store appointment calendar information to and retrieve appointment calendar data from dealer in-house database 44. Dealer website server computer 34 hosts a website that can be displayed on customer computer 40 through a network. Server computer 36 can be utilized to act as a conduit for information or data being transmitted between dealer in-house computer 32 and dealer website server computer 36.

According to one implementation of the system embodiment depicted by FIG. 2, a customer can schedule an appointment online by utilizing customer computer 40 or offline by contacting the dealer over the phone or in person. In the latter case, a dealer representative utilizes dealer in-house scheduling computer 38 during the appointment scheduling process. In either case, the same appointment calender, appointment calender 42, is utilized.

As a non-limiting example of online appointment, the customer can initiate the appointment scheduling process by requesting open appointments through a user interface contained on customer computer 40. In turn, dealer website server computer 34 transmits a request for open appointments to dealer in-house computer 32, which identifies a plurality of open appointments by accessing appointment calender 42 stored in dealer in-house database 44. The plurality of open appointments is then transmitted by dealer in-house computer 32 to dealer website server computer 34. Then, the plurality of open appointments is displayed on a user interface contained on customer computer 40. The customer then selects an open appointment from the plurality, which is transmitted in real-time to dealer in-house computer 32 through dealer website computer 34 in order to automatically confirm the appointment and automatically update the appointment calender 42 so that two customers cannot schedule the same appointment. In rare situations, an offline appointment can be confirmed at the same appointment time as the customer's unconfirmed appointment selection. This can occur between the short period of time between identification of the plurality of open appointments and confirmation of the online customer's selection. In this situation, the dealer in-house computer 32 transmits a rejection notice to dealer website server computer 34 and the online customer can select from other open appointments in the plurality.

Figure 3:
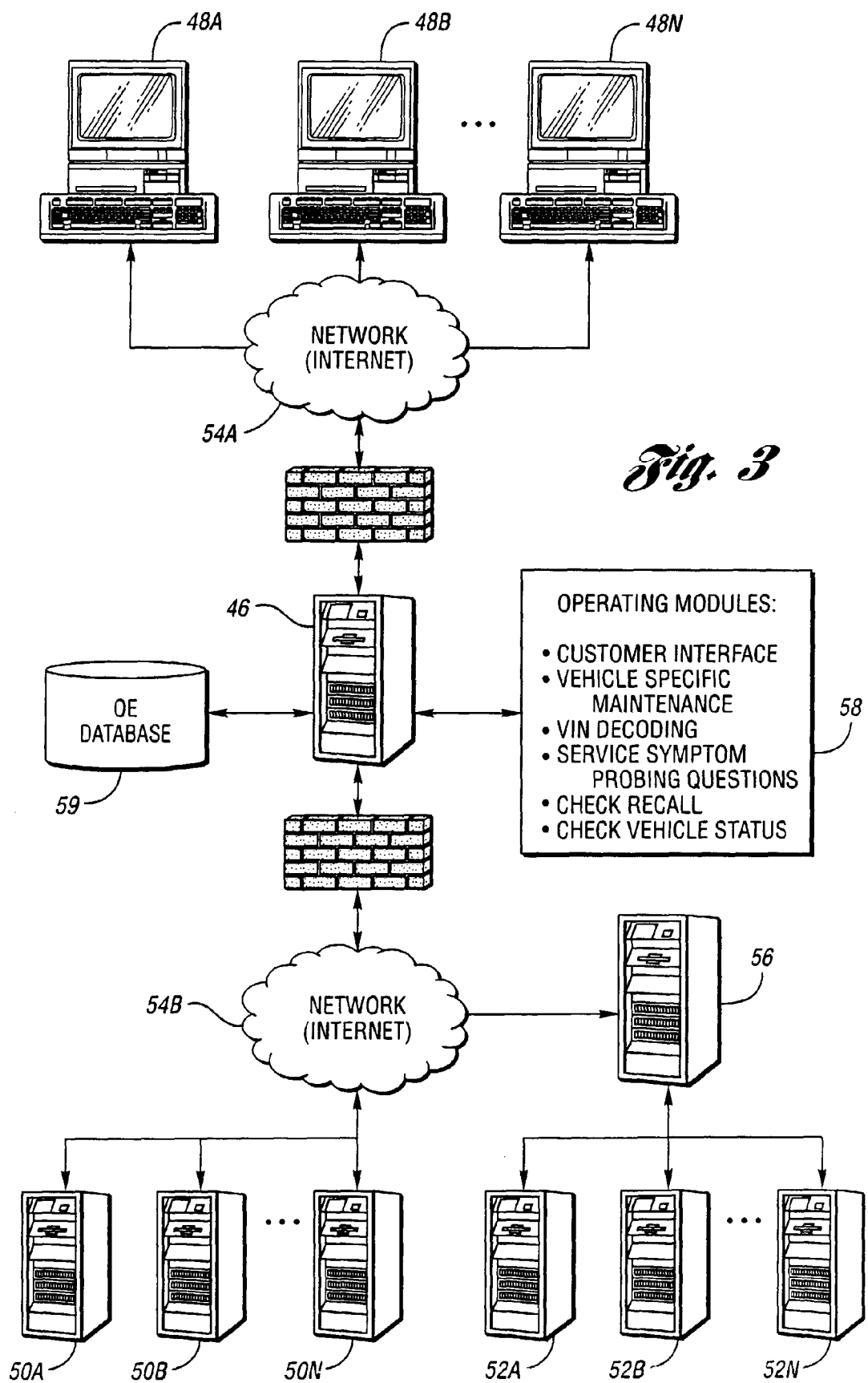
FIG. 3 is a logical schematic diagram illustrating a preferred system for implementing the present invention.

FIG. 3 is preferred logical schematic diagram implementing the present invention. FIG. 3 illustrates an at least one server computer 46 operably serving a plurality of customer client computers 48A-48N, a plurality of dealer in-house computers 50A-N and dealer middleware server 56 via networks 54A and 54B, respectively. It should be understood that server computer 46 can also operably service vehicle service providers that are not dealers. For example, server 46 can be configured to operably service non-OEM service shop in-house computers.

In accord with a preferred embodiment of the present invention, customer client computers 48A-N communicate with server computer 46 utilizing a TCP-IP communication via the Internet. In accord with a preferred embodiment, the Internet connection can be a dealer website or other web application. In certain embodiments, dealer website server 34, as depicted in FIG. 2, can host the dealer website or other web application. Dealer in-house computers 50A-N preferably communicate with server computer 46 utilizing a TCP-IP communication protocol via the Internet, including XML protocol. Dealer in-house computers 52A-N preferably communicate with dealer middleware server 56 utilizing a TCP-IP communication protocol via the Internet, including XML protocol.

Server computer 46 is configured to operably execute operating modules 58, including the customer interface module, the vehicle specific maintenance module, the VIN decoding module, the check recall module, the check vehicle status module, and the service symptom probing question module. Server computer 46 can also communicate with original manufacturer (OE) database 59. As described in greater detail below, operating modules 58 for vehicle specific maintenance and check recalls can advantageously retrieve data stored in OE database 59 to provide a customer real-time and up-to-date recall information and/or maintenance information.

Figure 4:
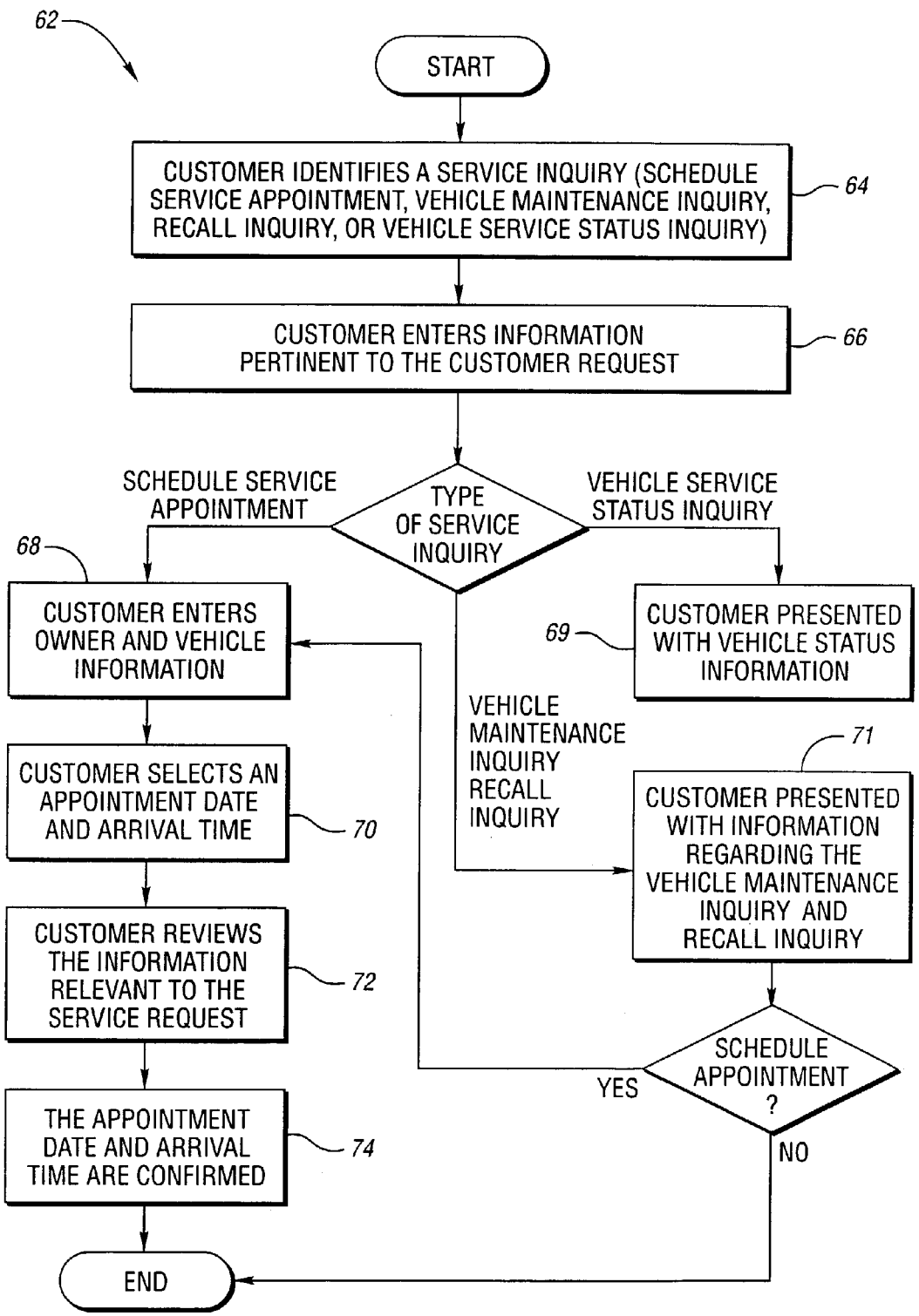
FIG. 4 is a block flow diagram illustrating a preferred methodology for implementing the present invention.

FIG. 4 is a block flow diagram illustrating a preferred methodology 58 for implementing the present invention. As represented in block 60, a customer identifies a service inquiry, which can be a schedule service appointment request, a vehicle maintenance inquiry, a recall inquiry, or a vehicle service status inquiry. Preferably, the customer identifies the service inquiry from a graphical user interface (GUI) hosted by server 46. The GUI, like other GUIs provided in accord with the present invention, may be developed and/or configured utilizing a plurality of client-server interface languages and applications including but not limited to hypertext markup language (HTML), Java Servlets and Java Script. Preferably, the GUI comprises a "Schedule Appointment" button, a "Vehicle Maintenance" button, a "Check Recalls" button, and a "Service Status" button. Additionally, the GUI preferably comprises instructional text, which aids the customer in making their selection.

As represented in block 66, the customer enters information pertinent to the service inquiry. Preferably, the customer can enter information pertinent to multiple service inquiries prior to scheduling a service appointment. For example, the customer can inquire about a vehicle maintenance schedule. After the customer interface module 58 displays the vehicle maintenance schedule, the customer can either decide to schedule a service appointment, identify another service inquiry, or exit the system. Under choice two, the customer can enter information pertinent to a schedule service appointment request. After entering the information pertinent to the two service inquiries, the customer can schedule a service appointment date and arrival time for regular maintenance and the service request, or enter information regarding yet another service inquiry.

Figure 5:
FIG. 5 illustrates a preferred GUI for entering information regarding a vehicle service inquiry.

If the customer identifies the schedule service appointment request, an at least one GUI hosted by server 46 is preferably utilized for entering the information pertinent to the service appointment request. As depicted as FIG. 5, a first service request GUI 75 preferably contains a data input field 77 for entering a service request or a symptom relating to the customer's service request. For example, the customer can enter "I need an Oil Change" or "I hear a noise". Preferably, once the customer completes entering the service request into data input field 77, the customer selects "Continue" button 79 that is contained on the first service request GUI.

Upon selecting the "Continue" button 79, the customer can be presented with an at least two symptom probing questions, depending on the information typed in data input field 77. The at least two symptom probing questions are selected by the service symptom probing question module 58 hosted by server 46. Preferably, the service symptom probing question module 58 searches the text entered into the data input field of the first service request GUI to identify the at least two symptom probing questions.

For example, if the customer enters any of the following in the data input field of the first service request GUI: "shift" sub-string, "upshift" sub-string, "downshift" sub-string, "engage" sub-string, "automatic transmission", "trans", "transaxle", or "shift level", the customer is presented with a series of symptom probing questions relating to an automatic transmission problem. It should be understood that sub-string refers to a series of characters that are contained within a word. For example, "upshift" is a sub-string of upshifting, upshifted, upshift, etc.

Preferably, a first symptom probing question relating to the automatic transmission concern is, "When do you notice your automatic transmission concern?" Through a GUI interface, the customer is preferably presented with a list of possible responses, which include, but are not limited to, the following: "At Gear Selection", "After Gear Selection", "Normal Acceleration", "Heavy Acceleration", "Steady Speed", "Deceleration", "Coasting Down", "Braking", "Reverse", "Other", "Not Sure", etc. If the customer chooses "Other", the customer is prompted with a first symptom probing sub-question: "Please indicate specifically when the shifting concern is experienced." Preferably, the customer indicates a response in a GUI data input field. Preferably, a second symptom probing question is, "At what speed range does the transmission concern happen?" Through a GUI interface, the customer is preferably presented with a list of speed ranges to respond to the second symptom probing question. Preferably, a third symptom probing question is, "Describe how the transmission concern feels." Possible responses preferably include, "Slips on Light Acceleration", "Hard Upshift", "Mushy Downshift", "Other", "Not Sure", etc. If the customer chooses "Other", the customer is prompted, preferable in a GUI data input field, to indicate specifically how the transmission concern feels.

The responses to the symptom probing questions at least temporarily reside on server 46. The responses, as well as other information, comprise a request XML package that is sent to a dealer in-house computer.

According to the present invention, symptom probing questions are utilized for other vehicle concerns, which include heating concerns, air conditioning concerns, steering concerns, braking concerns, and smell concerns. It should be understood that symptom probing questions can be utilized for other vehicle concerns, for example, driveability concerns, climate control concerns, vibration concerns, chassis concerns, engine starting concerns, fluid leakage, manual transmission concerns, instrumentation concerns, entertainment system concerns, four wheel drive concerns, suspension concerns, and noise concerns, as long as the information collected from the symptom probing questions helps diagnose vehicle service needs when the vehicle and customer arrives at the dealership. It should also be understood that a GUI is preferably used to present the symptom probing questions to the customer and to collect the customer's responses.

With respect to heating concerns, if the customer enters, for example, "heat", "heater", "heating", "heat duct", etc., in the data input field of the first service request GUI, the customer is presented with a series of symptom probing questions related to a heating concern.

Preferably, a first symptom probing question relating to the heating concern is, "Please describe the feel of the air being discharged from your heater's vent(s)." Possible responses preferably include, but are not limited to, "No Air Flow", "Cool", "Luke Warm", "Warm", "Hot", "Other", etc. If the customer chooses "Luke Warm" or "Warm", the customer is prompted with a second symptom probing question: "How Long does it take to warm up your vehicle?" Possible responses to the second symptom probing question preferably include, but are not limited to, a list of time ranges, "Never really warms up", "Other", and "Not Sure". If the customer chooses "Other", the customer is prompted with a first symptom probing sub-question: "Please indicate specifically how long it takes for the vehicle to warm up." A third symptom probing question relating to the heating concern is, "At what temperature range do you first start to experience a noticeable lack of heater performance?" Possible responses to the third symptom probing question preferably include, but are not limited to, a list of temperature ranges, "All temperatures" and "Not Sure".

With respect to air conditioning concerns, if the customer enters, for example, "cool" sub-string, "AC", "air condition", etc., in the data input field of the first service request GUI, the customer is presented with a series of symptom probing questions related to an air conditioning concern.

Preferably, a first symptom probing question relating to the air conditioning concern is, "Please describe the feel of the air being discharged from you're A/C vent(s)." Possible responses preferably include, but are not limited to, "Icy Cold", "Cool", "Semi-Cool", "Luke Warm", "Warm", "Hot" and "Not Sure". If the customer chooses "Cool" or "Semi-Cool", the customer is prompted with a second symptom probing question: "How long does it take to cool your vehicle's interior?" Possible answers to the second symptom probing question preferably include, but are not limited to, a list of times, "Never Really Cools", "Other", and "Not Sure". If the customer chooses "Other", the customer is prompted with a first symptom probing sub-question: "Please indicate specifically how long it takes." A third symptom probing question relating to the air conditioning concern is, "At what outside temperature range do you first start to experience a noticeable lack of A/C performance?" Possible responses to the third symptom probing question preferably include, but are not limited to, a list of temperature ranges, "All temperatures", and "Not Sure".

With respect to steering concerns, if the customer enters, for example, "steer" sub-string, "wheel", "turn" sub-string, "drift" sub-string, etc., in the data input field of the first service request GUI, the customer is presented with a series of symptom probing questions related to a steering concern.

Preferably, a first symptom probing question relating to the steering concern is, "When do you notice the steering concern?" Possible responses include, but are not limited to, "All The Time", "Right Turns", "Left Turns", "Breaking Hard", "Rainy Days", "Other", and "Not Sure". If the customer chooses "Other" in response to the first symptom probing question, the customer is prompted with a first symptom probing sub-question: "Please indicate specifically when you experience the steering concern." A second symptom probing question is, "At what speed or speed range is your steering concern most noticeable?" Possible responses include, but are not limited to, a list of speed ranges, "All Speeds" and "Not Sure". A third symptom probing question is, "Please indicate if you noticed any of the following symptoms." Preferably, a GUI displays a list of possible symptoms and the customer is prompted to click on the symptoms applicable to the customer's problem. Possible symptoms include, but are not limited to, "Steering Binds Up", "Hard Steering", "Tight Steering", "Creaking Noise", "Steers Left", "Pulls Right", "Not Sure", etc.

With respect to braking concerns, if the customer enters, for example, "brake" sub-string, "stop" sub-string, "shoe", "pad", "rotor", "drum", etc., in the data input field of the first service request GUI, the customer is presented with a series of symptom probing questions related to a braking concern.

Preferably, a first symptom probing question relating to the braking concern is, "When do you notice the braking concern?" Possible responses include, but are not limited to, "All The Time", "Braking Soft", "Driving Uphill", "Rainy Weather", "Very Hot Weather", "Other", and "Not Sure". If the customer chooses "Other" in response to the first symptom probing question, the customer is prompted with a first symptom probing sub-question: "Please indicate specifically when you experience the braking concern." A second symptom probing question is, "At what speed or speed range is your braking concern noticeable?" Possible responses include, but are not limited to, a list of speed ranges, "All Speeds", and "Not Sure". A third symptom probing question is, "Please indicate if you also noticed any of the following symptoms." Preferably, a GUI displays a list of possible symptoms and the customer is prompted to click on the symptoms applicable to the customer's problem. Possible symptoms include, but are not limited to, "Pedal Pulsation", "Hard Pedal", "Spongy Pedal", "Low Pedal", "Grinding Noise", "ABS Light", etc.

With respect to smell concerns, if the customer enters, for example, "smoke" sub-string, "sulfur", "musty" sub-string, "exhaust", "fume", "rotten egg", etc., in the data input field of the first service request GUI, the customer is presented with a series of symptom probing questions related to a smell concern.

Preferably, a first symptom probing question relating to the smell concern is, "Please describe what the odor smells like." Possible responses include, but are not limited to, "Rotten Eggs", "Sulfur Odor", "Gasoline Fumes", "Anti-Freeze", "Other", and "Not Sure". If the customer chooses "Other" in response to the first symptom probing question, the customer is prompted with a first symptom probing sub-question: "Please indicate specifically what the odor smells like." A second symptom probing question is, "Where does the odor appear to be coming from?" Possible responses include, but are not limited to, "Engine Area", "Vehicle Interior", "Trunk/Cargo Area", "Heating Vents", "Vehicle Front", "Right Side", "Left Side", "Other", and "Not Sure". If the customer chooses "Other" in response to the second symptom probing question, the customer is prompted with a second symptom probing sub-question: "Please indicate specifically where you smell it." A third symptom probing question is, "When do you smell the odor?" Possible responses to the third symptom probing question preferably include, but is not limited to, "All the Time", "Braking", "After it Rains", "Steady Speed", "Other" and "Not Sure". If the customer chooses "Other" in response to the third symptom probing question, the customer is prompted with a third symptom probing sub-question: "Please indicate specifically when you smell it."

Once the customer completes answering the symptom probing question for the service request, the customer can enter information regarding another service request.

Figure 6A:

If the customer identifies the vehicle maintenance inquiry, an at least one GUI hosted by server 46 is preferably utilized for entering the information pertinent to the vehicle maintenance inquiry. FIGS. 6a and 6b illustrate a preferred GUI 76 hosted by server 46 for entering the information pertinent to the vehicle maintenance inquiry. Preferably, the customer is prompted to enter the mileage of the vehicle in data input field 78. The customer is also prompted to either enter the vehicle identification number ("VIN") in data input field 80 or enter the vehicle make, the model year, the vehicle model, and the maintenance schedule type in data input fields 82. If the customer selects the "Check VIN" button 84, the VIN entered into VIN input field is verified as valid on server 46 by operating module 58 for VIN decoding. If the VIN entered by the customer is not valid, the customer is prompted to check the VIN number and re-enter it. Upon selecting "Continue" button 86, the vehicle specific maintenance module 58 uses the data entered into data fields 78 and 80 or 82 to retrieve the vehicle maintenance information from OE database 59, which includes, but is not limited to, OEM recommended current service interval, OEM recommended next service interval, and OEM previous major service interval.

Figure 7:
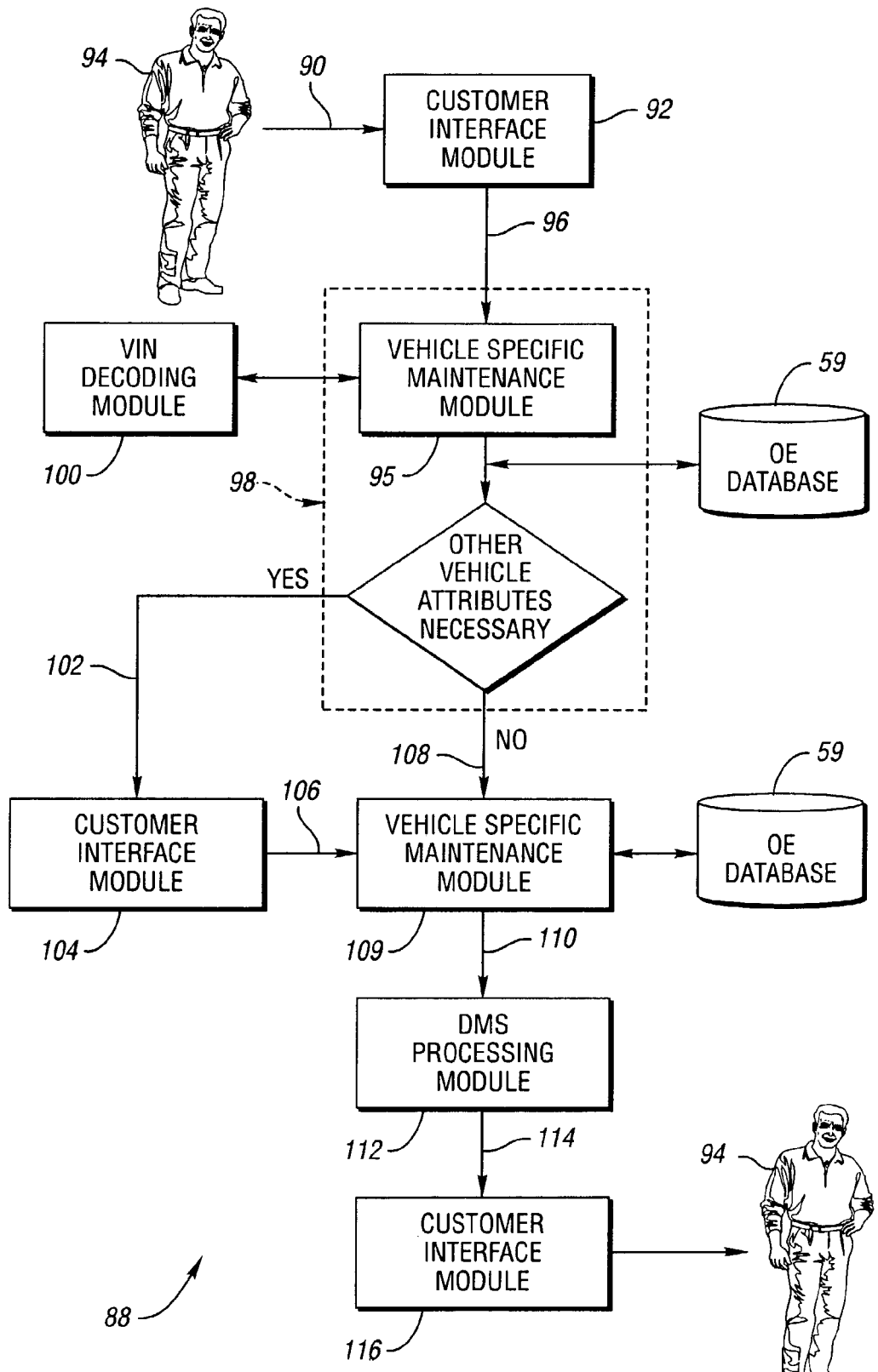
FIG. 7 is a block flow diagram illustrating a preferred methodology for retrieving vehicle information from an OE database based on vehicle information.

FIG. 7 is a block flow diagram illustrating a preferred methodology 88 for retrieving vehicle maintenance information from OE database 59 based on vehicle information. According to arrow 90 and block 92, service customer 94 inputs vehicle information, for example vehicle make, model, year and mileage, or VIN and mileage, through the customer interface module. As depicted by arrow 96 and block 98, the customer interface module transmits the vehicle information to the vehicle specific maintenance module. If the vehicle information is VIN and mileage, the VIN decoding module is preferably used to determine other vehicle information, such as make, model, and year, as depicted in block 100.

According to block 98, the vehicle specific maintenance module accesses data stored in OE database 59 to determine whether additional information is necessary to retrieve the vehicle maintenance information.

As depicted by block 98, if other vehicle information, otherwise referred to as vehicle attributes, is necessary, the specific vehicle maintenance module 95 transmits a request for other vehicle information. The request is sent to customer interface module, as depicted by block 104. In the case of the vehicle information being make, model, year, and mileage, the customer interface module preferably displays each attribute as a drop down for vehicle customer 94 to specify the other attribute values. Non-limiting examples of other attributes, include, but are not limited to, fuel type and transmission type. In the case of the vehicle information being VIN and mileage, the customer interface module preferably displays a drop down with transmission types for service customer 94 to specify the transmission type.

As depicted by arrow 106, in the case of needing additional information, or arrow 108, if additional information is unnecessary, and block 109, the vehicle information necessary to retrieve the scheduled maintenance information is transmitted to the vehicle specific maintenance module, which retrieves previous, current, and next maintenance schedules from OE database 59. It should be understood that the maintenance schedules can be manufacturer recommended and/or dealer-recommended services depending on the implementation. Moreover, the scheduled maintenance information and other maintenance information, such as uniform codes and mileage, can be used to retrieve dealer specific maintenance bundle pricing from a dealer management system (DMS) processing module, as depicted by arrow 110 and block 112. The dealer specific maintenance bundle pricing can be displayed to customer 94 depending on the implementation of the present invention.

After processing, in either scenario detailed above, the DMS processing module transmits the maintenance schedules to the customer interface module for display to vehicle customer 92, as depicted by arrow 114 and block 116.

Preferably, transmission of data, as depicted arrows 96, 102, 106, 110 and 112, is accomplished via XML packages, using SOAP protocol. Table 1 contains an example of an XML package for transmitting vehicle make, model, year and mileage information to the vehicle maintenance module. It should be understood that the content, arrangement and language of the generic XML package of Table 1 and other XML packages according to the present invention can be rearranged, modified and/or supplemented to best fit a particular implementation of the present invention.

TABLE 1

```
<QCMConfigRequest>
    <ClientCode>VSAD</ClientCode>
    <Language>EN-US</Language>
        <CurrentMiles_Kilometers>25000</CurrentMiles_Kilometers>
    <Driving Conditions>Normal</Driving Conditions>
    <VehicleDesc>
        <VehicleBreakdown>
            <Model>Crown Victoria</Model>
            <Make>Ford</Make>
            <Year>2002</Year>
        </VehicleBreakdown>
    </VehicleDesc>
</QCMConfigRequest>
```

Table 2 contains an example of a XML package for transmitting VIN and vehicle mileage information to the vehicle maintenance module.

TABLE 2

```
<QCMConfigRequest>
    <ClientCode>VSAD</ClientCode>
    <Language>EN-US</Language>
    <CurrentMiles_Kilometers>25000</CurrentMiles_Kilometers>
    <Driving Conditions>Normal</DrivingConditions>
    <VehicleDesc>
        <VehicleBreakdown>
            <VIN>1FAFP5220YA104582</VIN>
        <VehicleBreakdown>
    <VehicleDesc>
</QCMConfigRequest>
```

Table 3 contains an example of a XML package for transmitting a request for other vehicle attribute information if vehicle customer 94 provides vehicle make, model, year and mileage information.

TABLE 3

```
<QCMConfigDictionary>
    <Dictionary>
        <DataDefine Id="0" Type="Make" Desc="Ford"/>
        <DataDefine Id="1" Type="Model" Desc="Test"/>
        <DataDefine Id="2" Type="Year" Desc="2001"/>
        <DataDefine Id="3" Type="Fuel" Desc="Gas"/>
        <DataDefine Id="4" Type="Cylinders" Desc="7 cylinders"/>
        <DataDefine Id="5" Type="Transmission" Desc="Automatic"/>
        <DataDefine Id="6"Type="CurentMileage_kilometers"Desc="25000"/>
        <DataDefine Id="7" Type="DrivingConditions" Desc="Normal"/>
        <DataDefine Id="8" Type="Cylinders" Desc="9 cylinders"/>
        <DataDefine Id="9" Type="State" Desc="California"/>
        <DataDefine Id="10" Type="State" Desc="Other"/>
        <DataDefine Id="11" Type="Fuel" Desc="Diesel"/>
    </Dictionary>
    <DataTree>
        <Make Id="0"/>
        <Model Id="1"/>
        <Year Id="2"/>
        <CurrentMileage_Kilometers Id="6"/>
        <Driving Conditions Id="7"/>
        <Fuel Id="3">
            <Cylinders Id="4">
                <Transmission Id="5">
                    <State Id="9"/>
                    <State Id="10"/>
                <Transmission>
            </Cylinders>
            <Cylinders Id="8">
                <Transmission Id="5">
                    <State Id="9"/>
                    <State Id="10"/>
                <Transmission>
            </Cylinders>
        </Fuel>
        <Fuel Id="11">
            <Cylinders Id="4">
                <Transmission Id="5">
                    <State Id="9"/>
                    <State Id="10"/>
                </Transmission>
            </Cylinders>
            <Cylinders Id="8">
                <Transmission Id="5">
                    <State Id="9"/>
                    <State Id="10"/>
                </Transmission>
            </Cylinders>
```

TABLE 3-continued

```
        </Fuel>
    </DateTree>
</QCMConfigDictionary>
```

Table 4 contains an example of a XML package for transmitting a request for transmission type if vehicle customer 94 provides VIN and vehicle mileage.

TABLE 4

```
<QCMConfigDictionary>
    <Dictionary>
        <DataDefine Id="0" Type="Make" Desc="Ford"/>
        <DataDefine Id="1" Type="Model" Desc="Test"/>
        <DataDefine Id="2" Type="Year" Desc="2001"/>
        <DataDefine Id="3" Type="Fuel" Desc="Gas"/>
        <DataDefine Id="4" Type="Cylinders" Desc="7 cylinders"/>
        <DataDefine Id="8" Type="Cylinders" Desc="9 cylinders"/>
        <DataDefine Id="5" Type="Transmission" Desc="Automatic"/>
        <DataDefine Id="6" Type="CurrentMileage_Kilometers" Desc="25000"/>
        <DataDefine Id="7" Type="DrivingConditions" Desc="Normal"/>
        <DataDefine Id="9" Type="State" Desc="California"/>
        <DataDefine Id="10" Type="State" Desc="Other"/>
    </Dictionary>
    <DataTree>
        <Make Id="0"/>
        <Model Id="1"/>
        <Year Id="2"/>
        <CurrentMileage_Kilometers Id="6"/>
        <DrivingConditions Id="7"/>
        <Fuel Id="3">
            <Cylinders Id="4">
                <Transmission Id="5">
                    <State Id="9"/>
                    <State Id="10"/>
                </Transmission>
            </Cylinders>
            <Cylinders Id="8">
                <Transmission Id="5">
                    <State Id="9"/>
                    <State Id="10"/>
                </Transmission>
            </Cylinders>
        </Fuel>
    </DataTree>
</QCMConfigDictionary>
```

Table 5 contains an example of a XML package for transmitting a request for the scheduled maintenance information.

TABLE 5

```
<QCMMaintenanceRequest>
    <ClientCode>OWNR</ClientCode>
    <Make>Ford</Make>
    <Model>TestModel 1</Model>
    <Year>2000</Year>
    <Fuel>Gas</Fuel>
    <Cylinders>9 cylinders</Cylinders>
    <Transmission>Automatic</Transmission>
    <State>Other</State>
    <CurrentMiles_Kilometers>25000</CurrentMiles_Kilometers>
    <DrivingConditions>Normal</DrivingConditions>
</QCMMaintenanceRequest>
```

Table 6 contains an example of a XML package for transmitting the scheduled maintenance information.

TABLE 6a

```
<QCMMaintenanceCatalog>
    <Maintenance Miles_Kilometers="10000" ReportType="Current" BundleCode='C10K' DealerBundleCode='D10K'>
        <Operation>Perfom multi-point inspection</Operation>
        <Operation>Replace engine oil and filter</Operation>
        <Operation Pcode='xxx'>Do Something</Operation>
    </Maintenance>
    <Maintenance Miles_Kilometers="15000" ReportType="Next" BundleCode='C15K' DealerBundleCode='D15K'>
        <Operation>Inspect brake system & rotate tires</Operation>
        <Operation>Inspect engine cooling system, hoses, and clamps</Operation>
        <Operation>Inspect steering linkage, ball joints, suspension and driveshaft</Operation>
        <Operation>Perform multi-point inspection</Operation>
        <Operation>Replace engine oil and filter</Operation>
        <Operation Pcode='xxy'> Do Something Again</Operation>
    </Maintenance>
    <Maintenance Miles_Kilometers="5000" ReportType="Previous" BundleCode='C5K' DealerBundleCode='D5K'>
        <Operation>Replace engine oil and filter</Operation>
        <Operation Pcode='xxz'>Do Something</Operation>
    </Maintenance>
</QCMMaintenanceCatalog>
```

Tables 6b and 6c contain examples of XML packages for transmitting a request for dealer specific maintenance bundle pricing based on vehicle information.

TABLE 6b

```
<?xml version="1.0" standalone="no"?>
<!DOCTYPE ServicePrice SYSTEM "ServicePrice.dtd">
<ServicePrice>
    <Transaction Sessionid="{6EBAA42A-244A-458F-AF78-221C3CA16806}" Dealerid="6055" StoreBranch=" ">
        <VehicleData Vin="1FMYU04131KB51071" VehModelYr="2001" VehMake="FORD" VehModel="ESCAPE" VehMileage="12000"/>
        <Bundle ReportType="Current">
            <FordBundleCode BundleCode="T10K"/>
            <DealerBundleCode BundleCode="DT10K"/>
            <VehicleBundleCodes>
                <VehicleBundleCode>P1</VehicleBundleCode>
                <VehicleBundleCode>P2</VehicleBundleCode>
                <VehicleBundleCode>P3</VehicleBundleCode>
            </VehicleBundleCodes>
        </Bundle>
        <Bundle ReportType="Next">
            <FordBundleCode BundleCode="T15K"/>
            <DealerBundleCode BundleCode="DT15K"/>
            <VehicleBundleCodes>
                <VehicleBundleCode>P5</VehicleBundleCode>
                <VehicleBundleCode>P6</VehicleBundleCode>
            </VehicleBundleCodes>
        </Bundle>
        <Bundle ReportType="Previous">
            <FordBundleCode BundleCode="T5K"/>
            <DealerBundleCode BundleCode="DT5K"/>
        </Bundle>
    </Transaction>
</ServicePrice>
```

TABLE 6c

```
<?xml version="1.0" standalone="no"?>
<!DOCTYPE ServicePrice SYSTEM "ServicePrice.dtd">
<ServicePrice>
    <Transaction
Sessionid="{6EBAA42A-244A-458F-AF78-221C3CA16806}"
    Dealerid="6055" StoreBranch=" ">
        <VehicleData Vin=" "VehModelYr="2001"
VehMake="FORD"
        VehModel="Taurus" VehMileage="12000"/>
        <Bundle ReportType="Current">
            <FordBundleCode BundleCode="C10K"/>
            <DealerBundleCode BundleCode="DC10K"/>
            <VehicleBundleCodes>
<VehicleBundleCode>P1</VehicleBundleCode>
<VehicleBundleCode>P2</VehicleBundleCode>
<VehicleBundleCode>P3</VehicleBundleCode>
            </VehicleBundleCodes>
        </Bundle>
        <Bundle ReportType="Next">
            <FordBundleCode BundleCode="C15K"/>
            <DealerBundleCode BundleCode="DC15K"/>
            <VehicleBundleCodes>
<VehicleBundleCode>P5</VehicleBundleCode>
<VehicleBundleCode>P6</VehicleBundleCode>
            </VehicleBundleCodes>
        </Bundle>
        <Bundle ReportType="Previous">
            <FordBundleCode BundleCode="C5K"/>
            <DealerBundleCode BundleCode="DC5K"/>
        </Bundle>
    </Transaction>
</ServicePrice>
```

Figure 8A:

The vehicle maintenance information is sent from server 46 through network 54A to customer computer 48 and is preferably displayed as GUI 118 as illustrated in FIGS. 8a and 8b. Preferably, GUI 118 contains customer vehicle information 120 and recommended scheduled maintenance information 122. The recommended scheduled maintenance information 122 preferably includes information regarding OEM recommended current service interval, OEM recommended next service interval, and OEM previous major service interval. In addition, information can be displayed regarding dealer recommended service and dealership maintenance pricing, if available. Preferably, server 46 obtains dealer recommended service information or dealership maintenance pricing through network 54B, using information provided by dealer in-house computers 50A-50N or dealer middleware server 56. GUI 118 also preferably includes check boxes 123 for the customer to select the desired maintenance.

GUI 118 also contains "Print Page" button 124, "Schedule Appointment" button 126, and "Next Service Request" button 128. Upon selecting "Print Page" button 124, the consumer is prompted to select a printer for printing the information that is displayed as part of GUI 118. Upon selecting "Next Service Request" button, the GUI for identifying a service inquiry is displayed. Upon selecting "Schedule Appointment" button 126, the customer is prompted to select an appointment date and time.

If the customer selects the recall inquiry, an at least one GUI hosted by server 46 is preferably utilized for entering information pertinent to the recall inquiry. Preferably, a GUI contains a data input field for entering the VIN. After the customer enters the VIN, the customer selects the "Continue" button. The VIN entered into data input field is verified as valid on server 46 by operating module 58 for VIN decoding. If the VIN entered by the customer is not valid, the customer is prompted to check the VIN number and re-enter it. Once the VIN is verified, the check recall module 58 determines whether any recalls exist for the customer vehicle.

FIG. 9 is a block flow diagram illustrating a preferred methodology 128 for implementing the VIN decoding and check recall modules in order to retrieve recall information from OE database 59 based on the VIN. According to arrow 130 and block 132, vehicle customer 134 inputs the VIN through the customer interface module. As depicted by arrow 136, the customer interface module transmits the VIN to vin decoding module 138 to verify that the VIN is valid. It should be understood that other VIN validation modules can be used other than vin decoding module 138 depending on implementation of the present invention. As depicted by arrow 140, the vin decoding module transmits a VIN verification message to customer interface module. If the VIN entered by the customer is not valid, the customer is prompted to check the VIN number and re-enter it. Once the VIN is verified, the VIN is transmitted to the check recall module as depicted by arrow 142 and block 144. As depicted by arrow 148 and block 150, recall information is transmitted from the check recall module to the customer interface module. The information is then displayed to vehicle customer 134 as depicted by arrow 152.

Preferably, transmission of data, as depicted by arrows 136, 140, 142, and 148, is accomplished via XML packages, using SOAP protocol. Table 7 contains an example of an XML package for transmitting VIN to the vin decoding

TABLE 7

VIN_Info("3FAFP31351R250793", "OWNR")

Table 8 contains an example of a XML package for transmitting a VIN verification message to the customer interface module.

TABLE 8

```
<Vehicle>
    <VIN>3FAFP31351R250793</VIN>
    <Year>2001</Year>
    <Make>FORD</Make>
    <Model>FOCUS</Model>
    <Series>ZX3</Series>
    <Cylinders>6</Cylinders>
    <DriveType></DriveType>
    <BoydStyle>2D HATCHBACK</BodyStyle>
    <Engine>2.0 LTR. 4CYL GAS NORMAL 130 HP</Engine>
    <Error>False</Error>
    <ErrorMessage></ErrorMessage>
</Vehicle>
```

Table 9 contains an example of a XML package for transmitting a check recall request to the check recall module.

TABLE 9

GetVehicle("1FAFP5220YA105697","OWNR")

Table 10 contains an example of a XML package for transmitting recall information to the customer interface module.

TABLE 10

```
<Vehicle vin="1FAFP5220YA105697">
    <RecallItems count="1">
        <RecallItem Vin="1FAFP5220YA105697"
RecallID="00E10" Status="" RecallDate="8/30/2000"
Title="FUEL DELIVERY MODULE" Description="" FAQPath=""
EndTrackingDate="1/1/2100" ExtraDescription=""/>
    </RecallItems>
</Vehicle>
```

If no recalls exist, a message is preferably displayed as part of a GUI that states, "Based on the Vehicle Identification Number entered, there are no open recalls for your vehicle." If recall(s) exist, a message is preferably displayed as part of a GUI that states, "Based on the Vehicle Number entered, see below for identified recall(s) for your vehicle." The GUI also preferably includes vehicle information (VIN, the vehicle make, the vehicle model, the model year, etc.) and the identified recalls. The GUI also preferably contains a "Schedule Appointment" button and a "Next Service Request" button. Upon selecting "Next Service Request" button, the GUI for identifying a service inquiry is displayed.

Figure 10A:
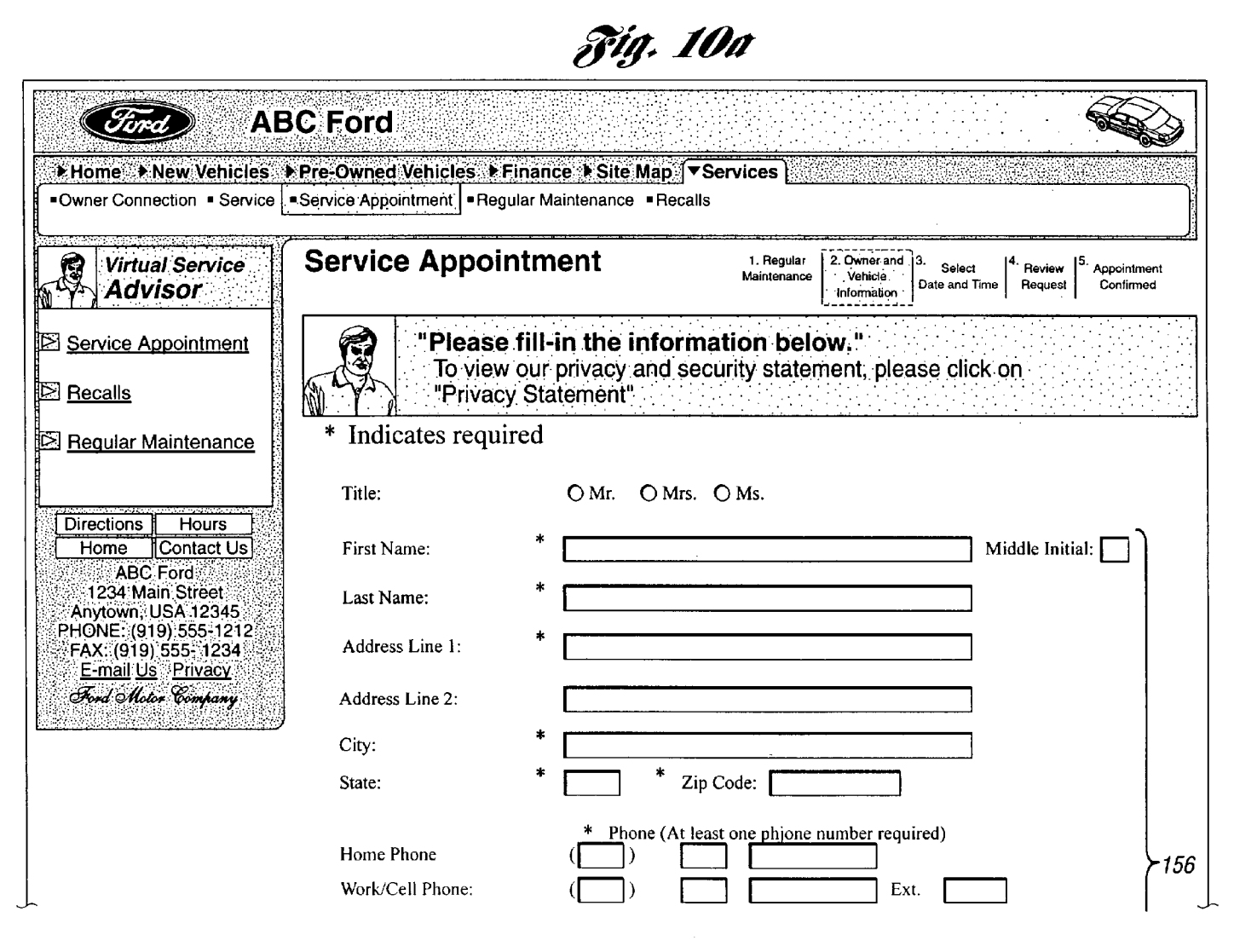
Figure 10B:
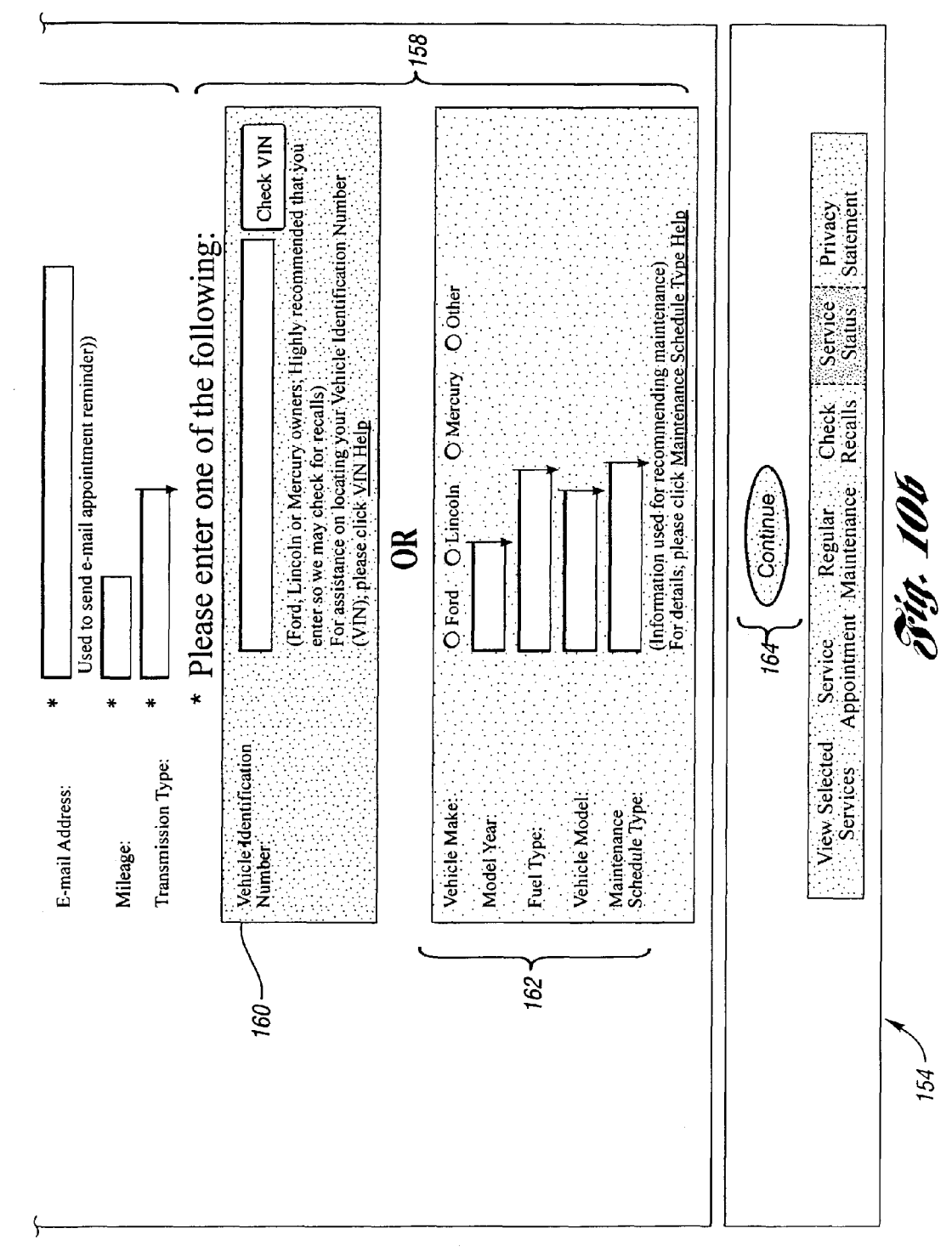

Upon selecting "Schedule Appointment" button, the customer is prompted to enter owner and vehicle information, as represented in block 68 of FIG. 4. FIGS. 10*a* and 10*b* illustrate a preferred GUI 154 hosted by server 46 for entering owner and vehicle information. GUI 154 comprises a plurality of data input fields 156 and 158 for defining owner and vehicle information, respectively. Data input fields 156 include, but are not limited to, customer title, first name, middle initial, last name, address, city, state, zip code, home phone, work phone, cell phone, e-mail address, mileage, and transmission type. The customer is also prompted to either enter the vehicle identification number ("VIN") in data input field 160 or enter the vehicle make, the model year, the vehicle model, and the maintenance schedule type in data input fields 162. Upon selecting "Continue" button 164, the owner and vehicle information is checked to verify that the customer has entered data in the required input fields. The required input fields are preferably first name, last name, address, city, state, zip code, e-mail address, mileage, and transmission type. If the customer neglects to enter data in at least one of the required input fields, a window preferably appears on computer 48 alerting the customer of the missing data. In addition, if the customer enters the VIN, the VIN is verified as valid on server 46 by operating module 58 for VIN decoding. If the VIN entered by the customer is not valid, the customer is prompted to check the VIN number and re-enter it. The verified owner and vehicle information at least temporarily resides on server 46.

Figure 11A:
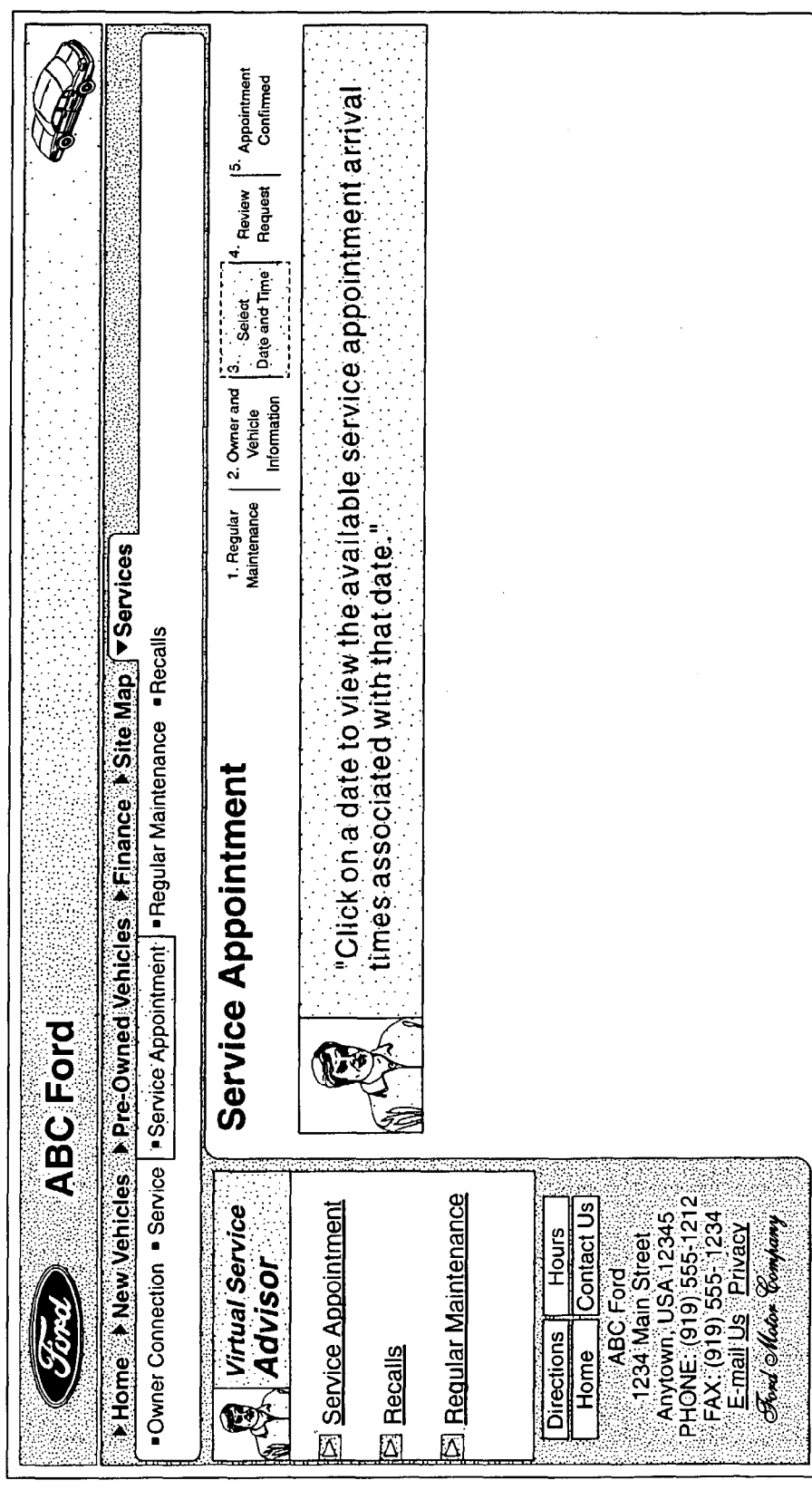
FIGS. 11a and 11b illustrate a preferred GUI for scheduling an appointment date and arrival time in accord with a preferred embodiment of the present invention.
Figure 11B:

As represented in block 70, the customer selects an appointment date and arrival time. FIGS. 11*a* and 11*b* illustrate a preferred GUI 166 for scheduling an appointment date and time. GUI 166 contains a calendar 168 wherein the customer can preferably select available dates 170 on calendar 168. The information on the calendar 168 is provided by a dealer in-house computer or the dealer middleware server. Preferably, a request XML package is sent to dealer server 50 or dealer middleware server 56 to request available appointment dates and arrival times. The communication between server 46 and dealer server 50 or dealer middleware server 56 is asynchronous and generally comprises server 46 sending the request XML package and receiving a response XML from either dealer server 50 or dealer middleware server 56 via SOAP protocol. Table 11 contains an example of the request XML package for requesting service appointment times in a 30 day window. It should be understood that the content, arrangement and language of the generic request XML package of Table 11 can be rearranged, modified and/or supplemented to best fit the communication between server 46 and dealer server 50 and dealer middleware server 56.

TABLE 11

```
<?xml version="1.0" standalone="no" ?>
<!DOCTYPE ApptRequest SYSTEM "ApptRequest.dtd">
```

TABLE 11-continued

```
<ApptRequest>
<Transaction
Sessionid="{6EBAA42A-244A-458F-AF78-221C3CA16806}"
StartDate="10/18/2001" Dealerid="6055" StoreBranch=""/>
</ApptRequest>
```

Preferably, the dealer server 50 or dealer middleware server 56 returns the response XML package, with 30 days of date and time openings for an appointment. Table 12 contains an example of the response XML package from dealer server 50 or dealer middleware server 56, sending available appointment times for the 30 day window.

TABLE 12

```
<?xml version="1.0" encoding="UTF-8"?>
<!-- DOCTYPE OpenAppts SYSTEM "OpenAppointment.dtd"-->
<openAppts
sessionID="{6EBAA42A-244A-458F-AF78-221C3CA16806}"
dealerID="6055">
   <ResponseStatus Status="Success" StatusCode="200"
Date="10/12/2001" Time="01:18 PM"/>
   <openSlots Date="10/12/2001">
      <time>
         01:15 PM
      </time>
      <time>
         01:30 PM
      </time>
   </openSlots>
   <openSlots Date="10/13/2001">
      <time>
         09:30 AM
      </time>
      <time>
         10:30 AM
      </time>
   </openSlots>
</openAppts>
```

Figure 11C:
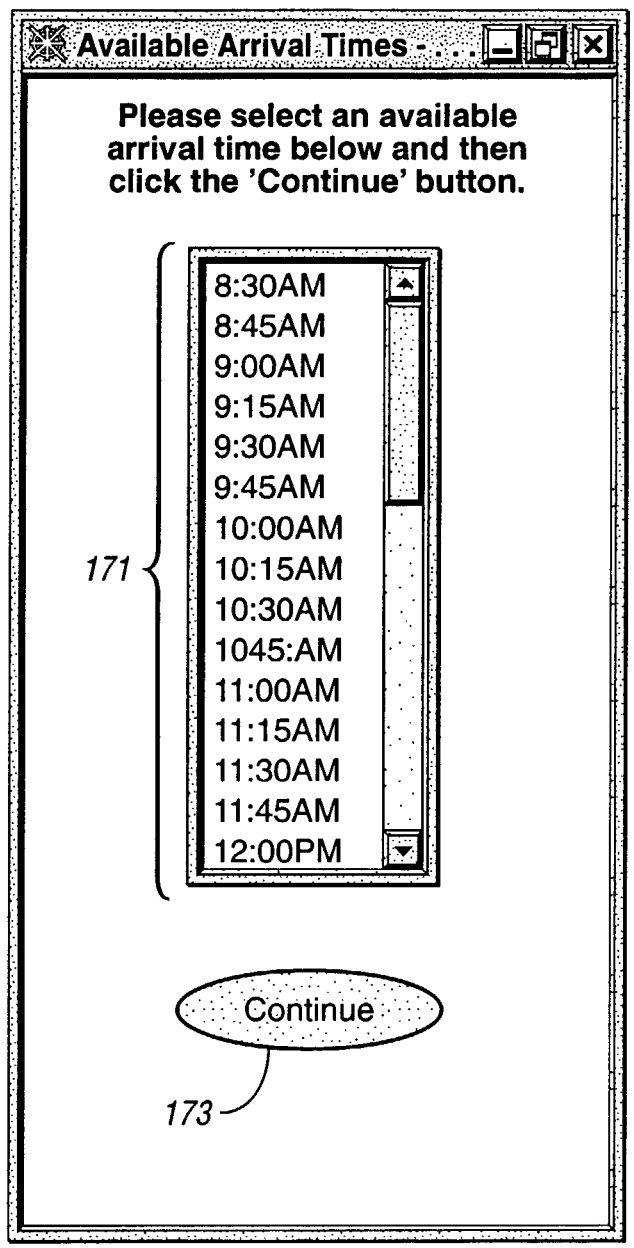
FIG. 11c illustrates a preferred GUI for choosing a specific arrival time in accord with a preferred embodiment of the present invention.

Upon selecting an available date 168, the customer is preferably presented with a pop-up window 169 that lists available arrival times 171, as illustrated in FIG. 11*c*. The customer preferably selects an available arrival time 171 and then selects a "Continue" button 173. Upon selecting the "Continue" button 173, the current date and arrival time selection 172 is displayed as part of GUI 166 of FIGS. 11*a* and 11*b*. Once the customer is satisfied with the current date and time selection 172, the customer selects "Continue" button 174.

Figure 12A:
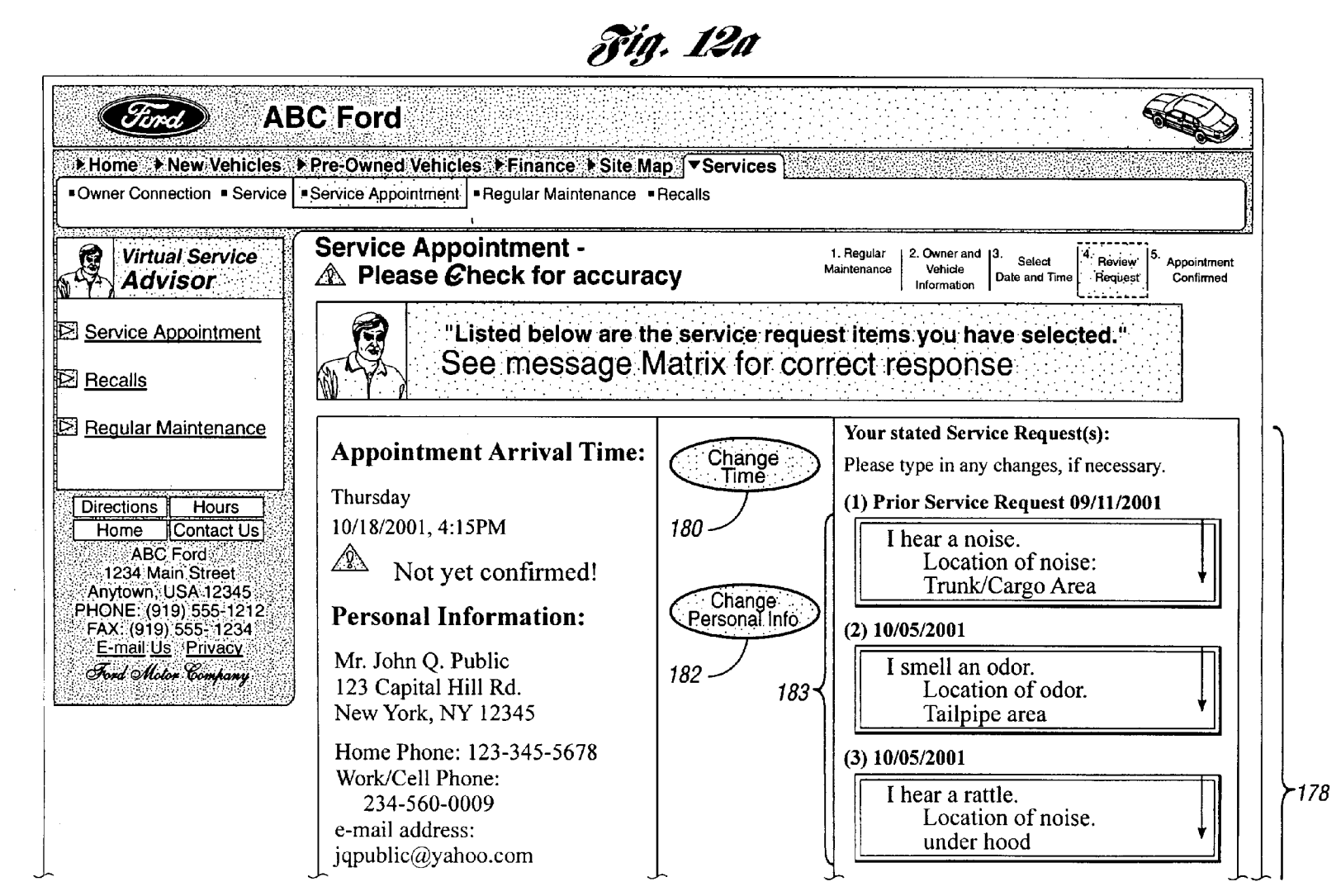

After selecting "Continue" button 174, the customer reviews the information relevant to the customer request(s) for accuracy, as depicted in block 72. FIGS. 12*a* and 12*b* illustrate a preferred GUI 176 for displaying the information relevant to the customer request(s) for the customer's review. The displayed information 178, includes, but is not limited to, appointment date and arrival time, personal information, vehicle information, service request(s) information, recalls (if any), and selected regular maintenance schedule. GUI 176 also contains "Change Time" button 180 and "Change Personal Info" button 182. The contents of text boxes 183 can be edited by the customer to reflects their service inquiry. Upon selecting either button, the customer is preferably prompted with a pop-up window for editing either the appointment date and arrival time or the personal information.

As depicted in block 74, the appointment date and time is confirmed after selecting the "Continue Appointment" button 184. The information collected regarding the customer request, including, but not limited to appointment date and arrival time, personal information, vehicle information, service request(s) information, and regular maintenance schedule is sent to dealer server 50 or dealer middleware server 56 via a request XML package across network 54b. Table 13 contains an example of the request XML package for making the service appointment.

TABLE 13

```
<?xml version="1.0" standalone="no" ?>
<!DOCTYPE Appointment SYSTEM "Appointment.dtd">
<Appointment>
    <Transaction
Sessionid="{6EBAA42A-244A-458F-AF78-221C3CA16806}"
Dealerid="6055" StoreBranch="">
        <VehicleData Vin="1FMYU04131KB51071" VehModelYr="2001"
VehMake="FORD" VehModel="ESCAPE" VehMileage="12000"/>
            <ServiceRequests id="1A">
                noise
Location of noise: Vehicle Front.
Occasion of noise: Right Turns.
Strength of noise: Mid Sometimes
            </ServiceRequests>
        </MaintRequests>
        <MaintRequests>
            <Bundle ReportType="Current"
BundleSource="Dealer"
                BundlePrice="$12.45">
                    Change Air Filter
                </Bundle>
        </MaintRequests>
        <Recall Recallid="00E10" RecallDesc=""/>
            <Comments>
                Need to get the car greased
            </Comments>
<CustomerData CustFirstName="Jambulingam"
CustLastName="Devarajan" CustInit="N" CustSalutation="Mr"
CustPhone="3451314545" CustEmail="jay@ford.com"
CustAddress1="123 Main St" CustAddress2="Apt 00"
CustCity="Westland" CustState="MI" CustZip="48186"
WkPhone="1231233422" WkPhoneExt=""/><RequestedAppt
Date="10/12/2001" Time="01:30 PM"/>
    </Transaction>
</Appointment>
```

The dealer server 50 or dealer middleware server 56 returns a response XML package, confirming or rejecting the service appointment request. Table 14 contains an example of a response XML package from dealer server 50 or dealer middleware server 56 acknowledging confirmation or rejection of the server appointment request.

TABLE 14

```
<?xml version="1.0" encoding="UTF-8"?>
<!-- DOCTYPE Confirmation SYSTEM "SendConfirmation.dtd" -->
<Confirmation>
    <ResponseStatus Status="Success" StatusCode="200"
Date="10/12/2001" Time="02:02 PM"/>
    <Transaction
Sessionid="{6EBAA42A-244A-458F-AF78-221C3CA16806}"
Dealerid="6055"
    Confirmed="Yes">
        <Appointment Date="10/13/2001" Time="02:00 PM"/>
    </Transaction>
</Confirmation>
```

If the appointment time and arrival date is not available, a GUI preferably displays a message that states the appointment date and arrival time is not available. The GUI preferably contains a "Retrieve Other Dates" button. Upon selecting the "Retrieve Other Dates" button, the preferred GUI 166 for scheduling an appointment date and time is displayed. If server 46 is having problems communicating with dealer server 50 or dealer middleware server 56, then the customer is prompted to retry by preferably clicking on a "Retry" button.

Figure 13A:
FIGS. 13a and 13b illustrate a preferred GUI for displaying confirmed information regarding the appointment date and arrival time, the service request(s) and the vehicle in accord with a preferred embodiment of the present invention.
Figure 13B:
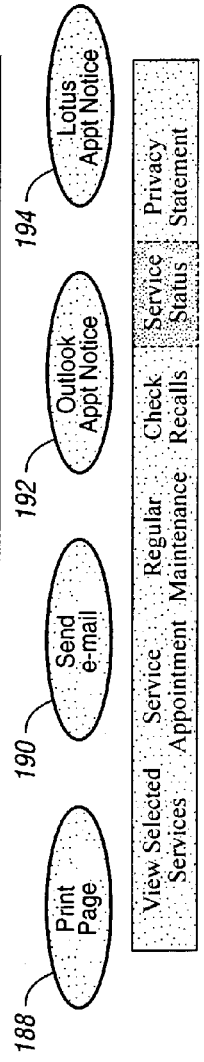

Once the acknowledgment is received by the dealer server 50 or dealer middleware server 56, a preferred GUI 186 displays information confirming the appointment, as illustrated in FIGS. 13a and 13b. In the case of server 52, dealer middleware server 56 pushes the information collected regarding the customer request to server 52. GUI 186 can include, but is not limited to, appointment date and time, personal information, vehicle information, service request(s) information, recall(s) information, and regular scheduled maintenance information. GUI 186 also preferably includes a "Print Page" button 188, a "Send e-Mail" button 190, an "Outlook Appointment Notice" button 192, and a "Lotus Appointment Notice" button 194. Upon selecting "Print Page" button 188, the consumer is prompted to select a printer for printing the information that is displayed as part of GUI 186. Upon selecting "Send e-Mail" button 188, the customer is prompted to select an e-mail address for sending the information that is displayed as part of GUI 186. Upon selecting either the "Outlook Appointment Notice" button 192 or "Lotus Appointment Notice" button 194, the information displayed on GUI 186 is imported into either Outlook or Lotus, respectively.

Figure 14A:

As depicted in block 69 of FIG. 4, another aspect of the present invention relates to a method and system of checking the status of a service request. It should be understood that the service request need not be initiated by using the customer user interface module 58. For example, after a customer arrives at a dealership and requests service, a dealership representative can recommend that the customer checks the vehicle service status by using the customer user interface of the present invention. As represented in block 66 of FIG. 4, the customer enters vehicle information regarding the vehicle service status inquiry. Preferably, a GUI, as illustrated in FIGS. 14a and 14b contains data input fields 196 for entering information necessary to check the vehicle service status. Preferably, checking the vehicle service status requires a customer to enter his/her last name and one of the following: repair order number, vehicle shop routing tag number, vehicle identification number, or phone number. GUI also preferably contains an "Check Status" button 198. Upon selecting the "Check Status" button 198, the information entered into the data input fields is sent to server 46 and the information is used by the check vehicle status module 58. The check vehicle status module 58 sends a request XML package to dealer server 50 or dealer middleware server 56 to request the status of a vehicle repair. A response XML package is sent back through dealer server 50 or dealer middleware server 56, which contains information regarding the status of the vehicle service request.

Figure 15A:

As represented in block 69, the customer is presented with vehicle service status information. Preferably, a GUI, as illustrated in FIGS. 15a and 15b, is used to display service status information 200 as displayed as part of a GUI. Pieces of service status information to be displayed on the preferred GUI include, but are not limited to: service status (e.g., work in progress or work completed), repair order number, vehicle make, model, model year, service advisor name, service phone number, estimated completion time, future appointments date, vehicle make, model, and model year. Additionally, the customer can enter his/her e-mail address in an data input field 202 if the customer would like to be notified via e-mail when the vehicle service is completed.

In certain embodiments, the present invention contemplates providing functionality for a pre-appointment user interface, otherwise referred to as a pre-appointment screen, that can be displayed on a monitor in communication with dealer in-house computer 32. The functionality is comprised of transmitting vehicle, customer and/or appointment information from customer computer 40 to dealer in-house computer 32 and displaying the information to a dealer representative from dealer in-house computer 32. The pre-appointment screen allows a dealer to see an in-coming request and maintain its conventional shop loading activities. This feature allows dealers to attach dispatch codes and validate multiple appointments, among other shop loading activities. Moreover, the customer and vehicle information can allow the dealer to identify change in ownership of a vehicle. Accordingly, the dealer will not create a duplicate record for the same vehicle and the same customer. Instead, the ownership information would be updated.

In certain embodiments, the present invention contemplates providing functionality to roll, or input vehicle information, for example, symptom probing answers into an electronic repair order residing in a database which is in communication with dealer-in house computer 32. Advantageously, the dealer does not have to print out the vehicle information and transfer it manually through data entry into the electronic repair order.

While the best mode for carrying out the invention has been described in detail, those familiar with the art to which this invention relates will recognize various alternative designs and embodiments for practicing the invention as defined by the following claims.

What is claimed:

1. A computer-implemented method comprising:
   receiving a service request, a scheduled maintenance request, a recall request or a vehicle status request at a dealer management system (DMS);
   receiving, at the DMS, a real-time ongoing vehicle repair status check;
   accessing, through the DMS, a database containing the real-time ongoing vehicle repair status; and
   transmitting, from the DMS to a user computer, the real-time ongoing vehicle repair status.

2. The online method of claim 1 further comprising retrieving recall information or maintenance information from an original equipment database based on the input information and causing display of the recall information or maintenance information.

3. The online method of claim 1 wherein the service request can additionally be for drivability concerns, climate control concerns, vibration concerns, chassis concerns, engine starting concerns, fluid leakage, instrumentation concerns, entertainment system concerns or noise concerns.

4. An apparatus for use in facilitating scheduling of a vehicle service appointment based on a service inquiry, comprising:
   a dealer computer having an interface for communicating over a computer network, the at least one dealer computer having a memory for storing data;
   a service request routine, wherein a service request for at least one of an HVAC, steering, braking, transmission or smell problems causes the dealer computer to send, to a user computer, at least two symptom probing questions, wherein at least one of the symptom probing questions is directed to the conditions under which the problem occurs, and wherein user entered responses are sent in response from the user computer to the dealer computer;
   a data structure stored in the memory, the data structure including open appointments data for facilitating scheduling of a vehicle service appointment based on a service inquiry; and
   an application program operable to utilize the interface for communicating over the computer network, executable on the dealer computer for transmitting in real-time at least a portion of the open appointments data in response to an open appointments request and is operable to receive in real-time an appointment request and input information regarding the service inquiry, wherein one of the plurality of open appointments is selectable as an appointment request.

5. The apparatus of claim 4 wherein the interface is comprised of an extended markup language (XML).

6. The apparatus of claim 4 wherein the application program is comprised of a SOAP protocol.

7. The apparatus of claim 4 further comprising a user computer operable to display the plurality of open appointments and transmit the input information and the appointment request to the dealer computer.

8. The apparatus of claim 7 wherein the application program is configured to transmit a confirmation or a rejection to the user computer.

9. The apparatus of claim 4 wherein the service request can additionally be for drivability concerns, climate control concerns, vibration concerns, chassis concerns, engine starting concerns, fluid leakage, instrumentation concerns, entertainment system concerns or noise concerns.

10. The apparatus of claim 4 wherein if the service inquiry is a service request, the input information includes information defining vehicle symptoms pertinent to the service request or if the service inquiry is the scheduled maintenance request or the recall request, the input information includes a vehicle identification number or the vehicle make, vehicle model year, and vehicle model.

\* \* \* \* \*